(12) United States Patent
Takenaka et al.

(10) Patent No.: US 11,552,301 B2
(45) Date of Patent: Jan. 10, 2023

(54) NEGATIVE ELECTRODE FOR METAL-AIR BATTERY

(71) Applicant: SHARP KABUSHIKI KAISHA, Sakai (JP)

(72) Inventors: Shinobu Takenaka, Sakai (JP); Hirotaka Mizuhata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 29 days.

(21) Appl. No.: 16/965,892

(22) PCT Filed: Jan. 23, 2019

(86) PCT No.: PCT/JP2019/001984
§ 371 (c)(1),
(2) Date: Jul. 29, 2020

(87) PCT Pub. No.: WO2019/151063
PCT Pub. Date: Aug. 8, 2019

(65) Prior Publication Data
US 2021/0043942 A1 Feb. 11, 2021

(30) Foreign Application Priority Data

Jan. 30, 2018 (JP) .............................. JP2018-013995

(51) Int. Cl.
*H01M 4/72* (2006.01)
*H01M 12/06* (2006.01)
(Continued)

(52) U.S. Cl.
CPC ............. *H01M 4/72* (2013.01); *H01M 12/06* (2013.01); *H01M 12/08* (2013.01); *H01M 50/531* (2021.01)

(58) Field of Classification Search
None
See application file for complete search history.

(56) References Cited

U.S. PATENT DOCUMENTS 2,503,970 A * 4/1950 Rupp ..................... H01M 4/72
429/211
4,477,546 A * 10/1984 Wheeler ................. H01M 4/70
429/211
(Continued)

FOREIGN PATENT DOCUMENTS

JP 2011-243364 A 12/2011
JP 2016-027542 A 2/2016
(Continued)

*Primary Examiner* — Amanda J Barrow
(74) *Attorney, Agent, or Firm* — ScienBiziP, P.C.

(57) ABSTRACT

In a metal negative electrode, a current collector includes a through-hole or a recess provided to extend from a front surface of a planar plate toward a back surface of the planar plate. A distance from a midpoint of a joining boundary to a point on a surface of the current collector is designated as a region dividing distance, the point defining a distance less than a maximum distance between the midpoint and a side or a surface of the current collector. In the current collector, a first region is a region defined by distances from the midpoint, the distances being a distance equal to the region dividing distance and distances greater than the region dividing distance, and, in the current collector, a second region is a region defined by distances from the midpoint that are less than the region dividing distance. A volume reduction ratio of the first region is greater than a volume reduction ratio of the second region, the volume reduction ratio of the first region being a ratio with respect to a volume of the first region determined assuming that the through-hole or the recess is not present, the volume reduction ratio of the second region being a ratio with respect to a volume of the second region determined assuming that the through-hole or the recess is not present.

12 Claims, 21 Drawing Sheets

(51) Int. Cl.
*H01M 12/08* (2006.01)
*H01M 50/531* (2021.01)

(56) References Cited

U.S. PATENT DOCUMENTS

| | | | | |
|---|---|---|---|---|
| 6,756,156 | B2* | 6/2004 | Ikeda | H01M 4/70 429/241 |
| 8,741,487 | B1* | 6/2014 | Duggan | H01M 4/74 429/242 |
| 9,356,294 | B2* | 5/2016 | Byun | H01M 10/0431 |
| 11,075,388 | B1* | 7/2021 | Roy | H01M 4/742 |
| 2002/0146625 | A1* | 10/2002 | Probst | H01M 4/72 429/241 |
| 2009/0197157 | A1* | 8/2009 | Viavattine | H01M 4/70 429/120 |
| 2011/0236748 | A1* | 9/2011 | Nakashima | H01M 10/0587 429/163 |
| 2013/0230756 | A1* | 9/2013 | Byun | H01M 10/049 429/94 |
| 2015/0243962 | A1* | 8/2015 | Hiroki | H01M 4/02 429/233 |
| 2016/0141587 | A1* | 5/2016 | Suh | H01M 50/10 429/179 |
| 2016/0308241 | A1* | 10/2016 | Kim | H01M 4/74 |
| 2016/0322612 | A1 | 11/2016 | Takahashi et al. | |
| 2017/0033327 | A1* | 2/2017 | Tajima | G06F 1/1652 |
| 2018/0226629 | A1* | 8/2018 | Hiroki | H01M 4/139 |
| 2020/0220150 | A1 | 7/2020 | Hiroki et al. | |

FOREIGN PATENT DOCUMENTS

| | | |
|---|---|---|
| JP | 2016-213185 A | 12/2016 |
| JP | 2017-174770 A | 9/2017 |
| WO | 2011/052122 A1 | 5/2011 |

\* cited by examiner

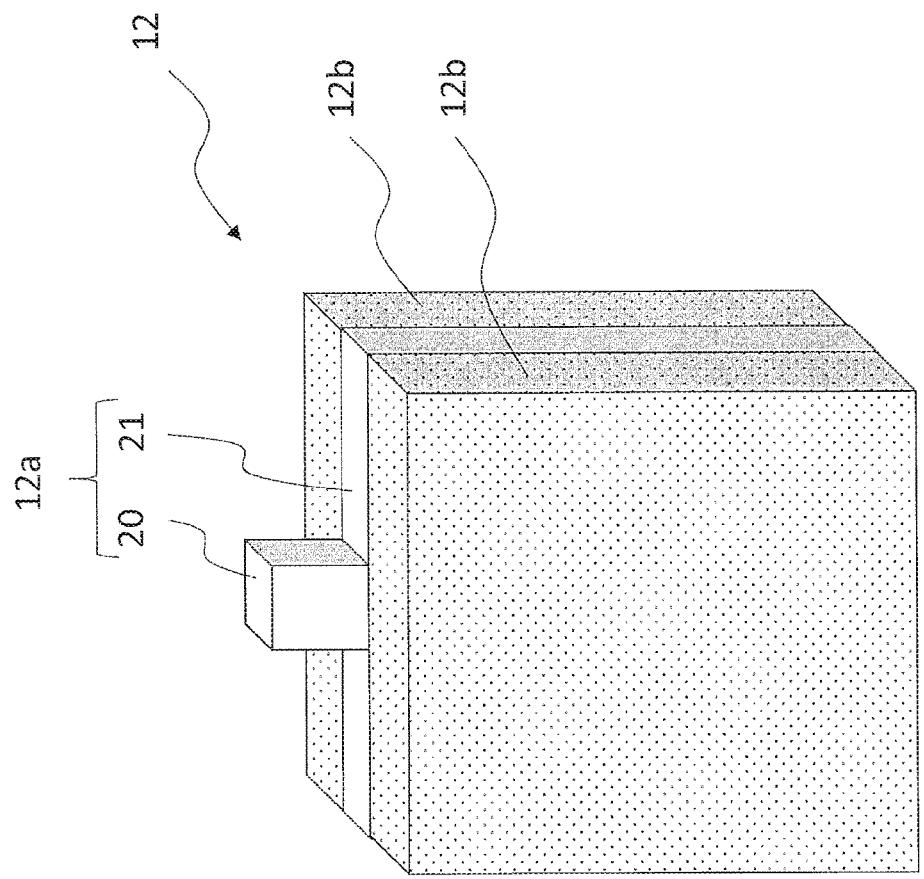

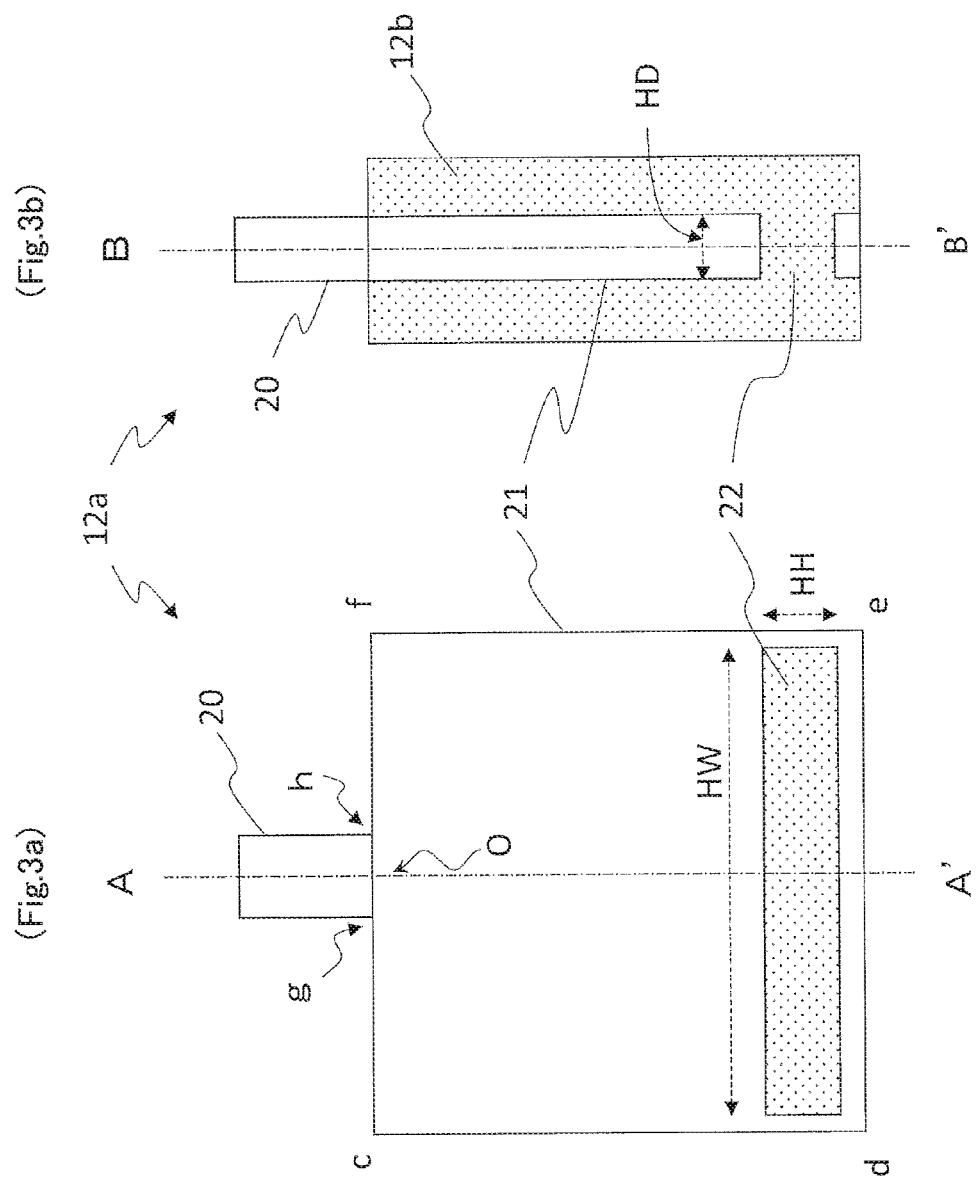

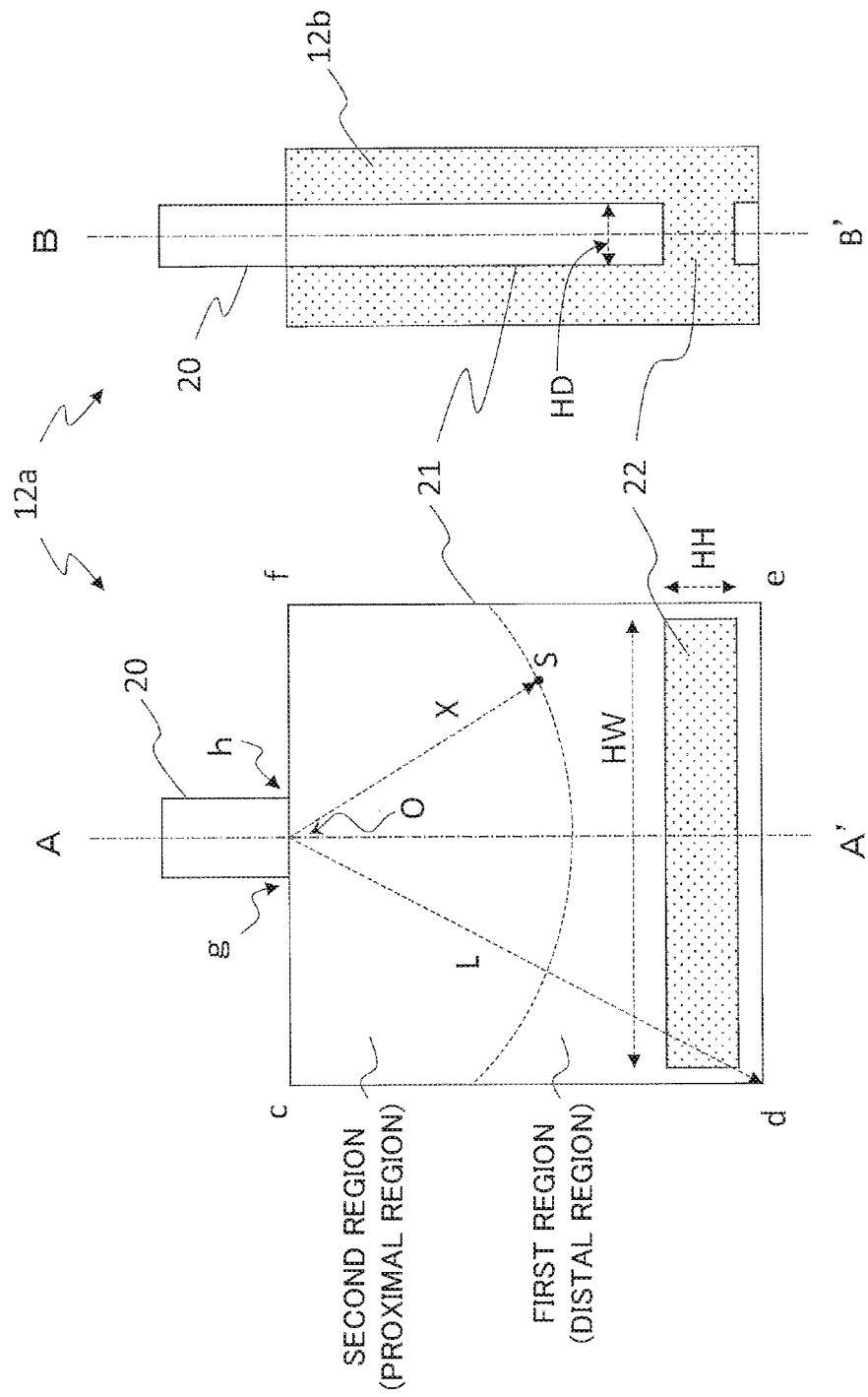

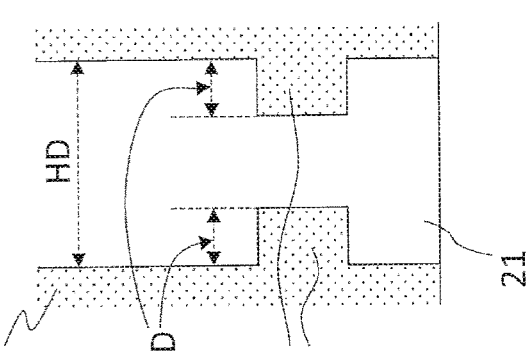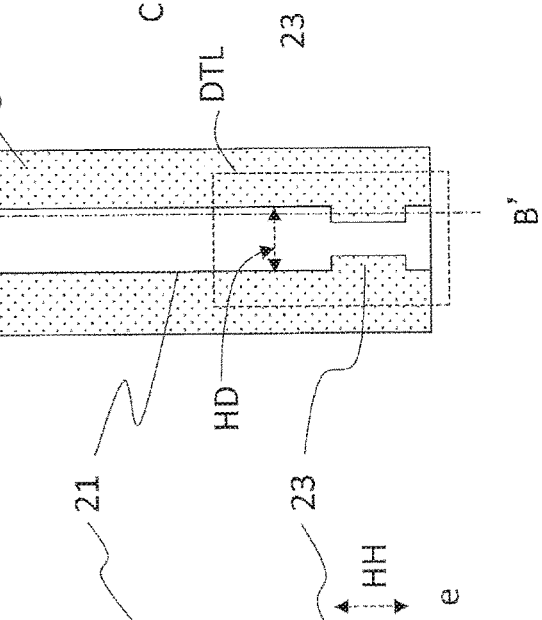

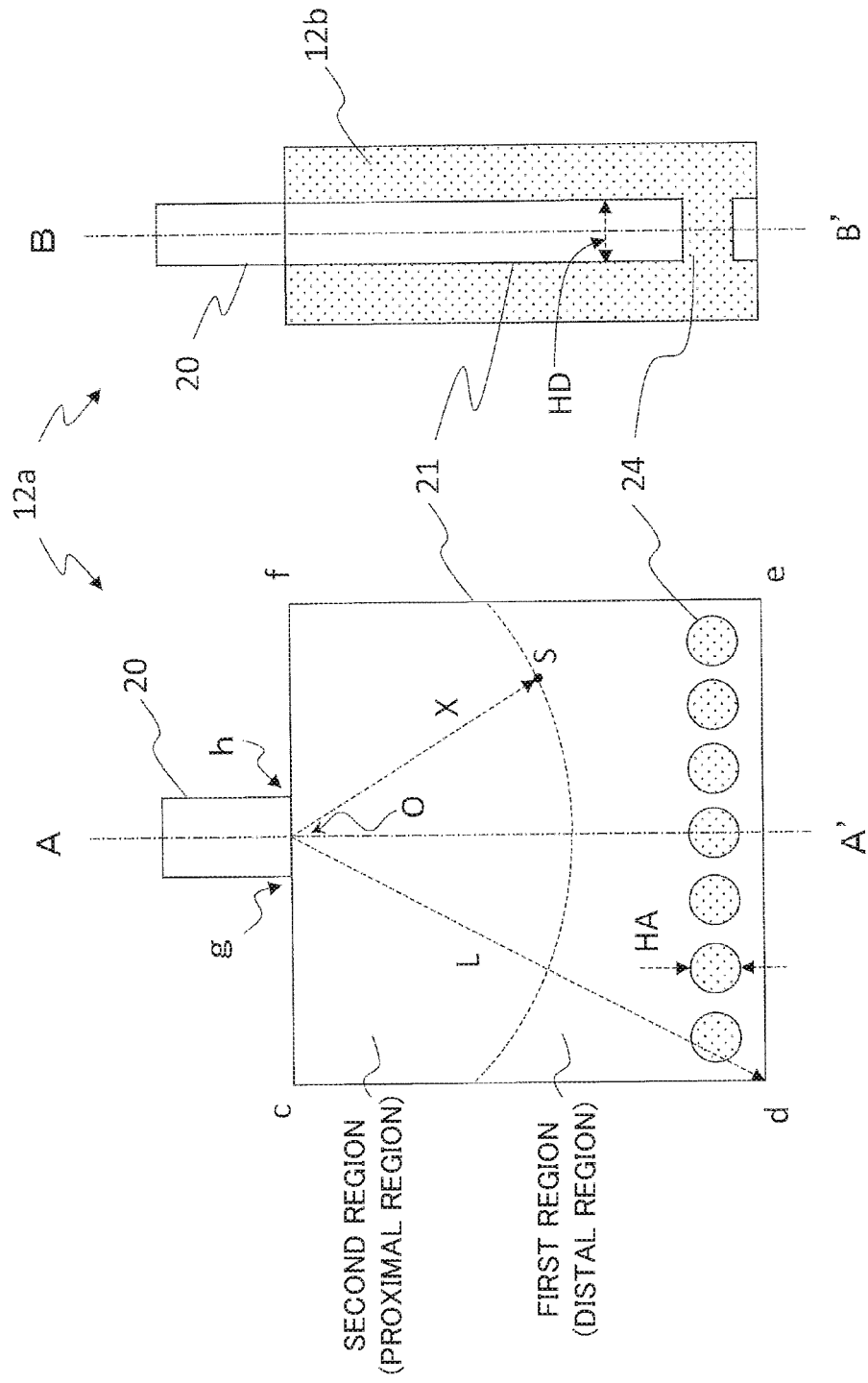

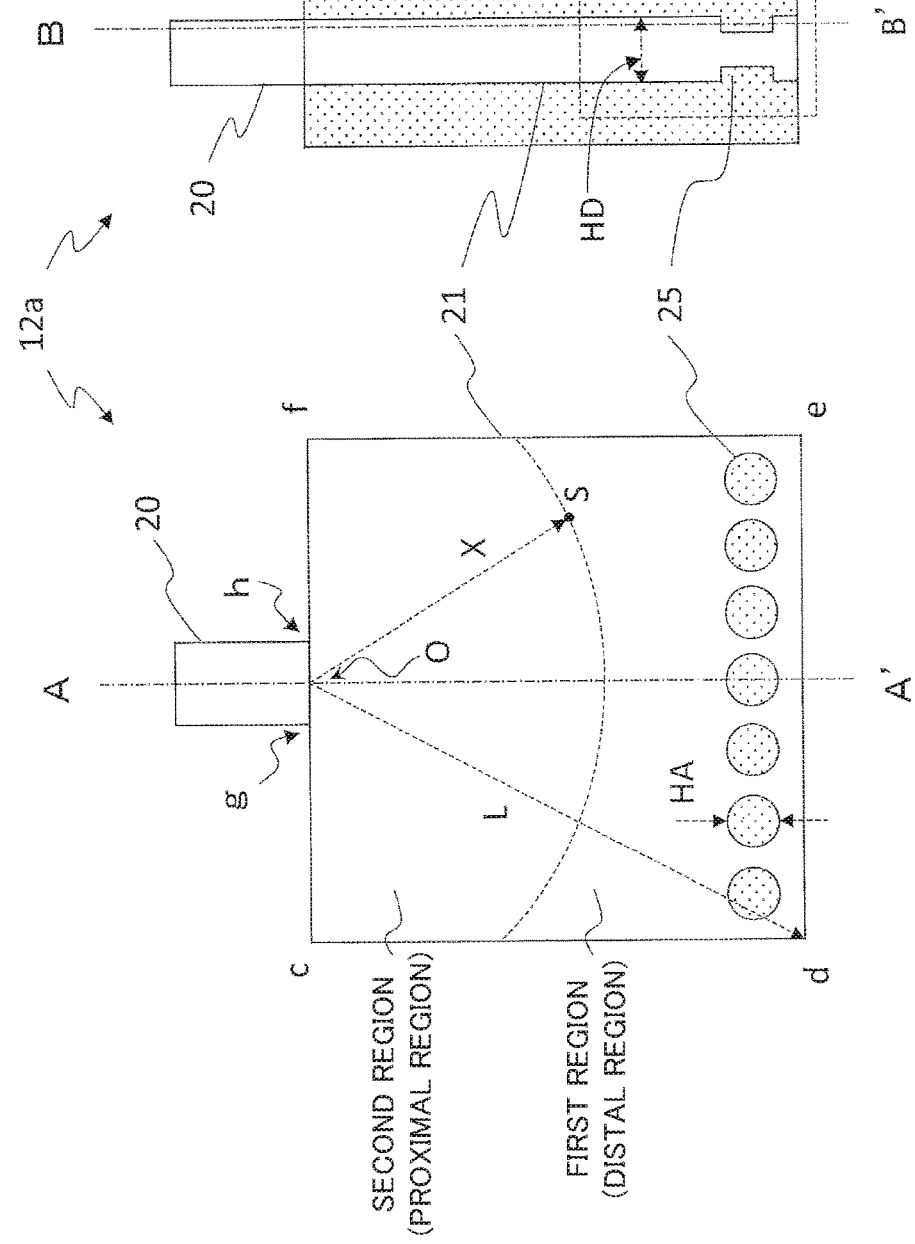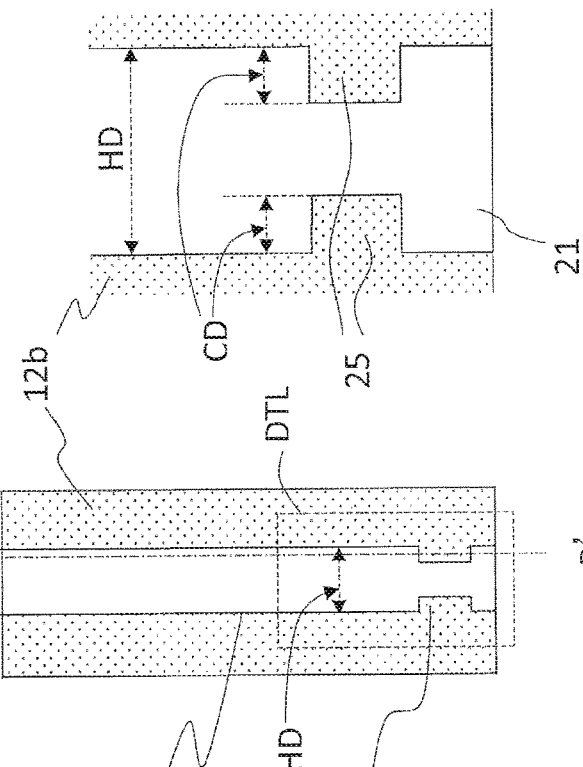

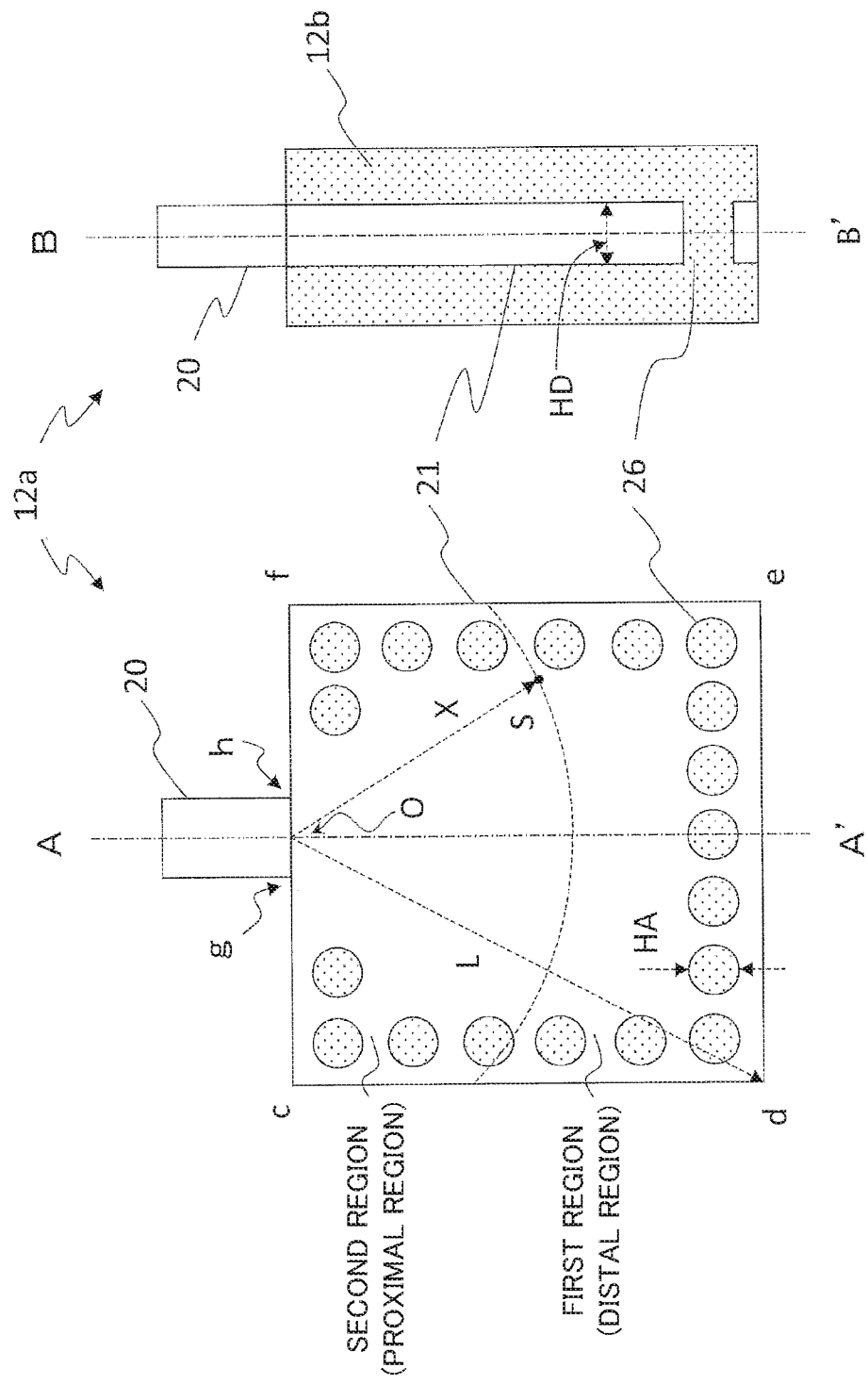

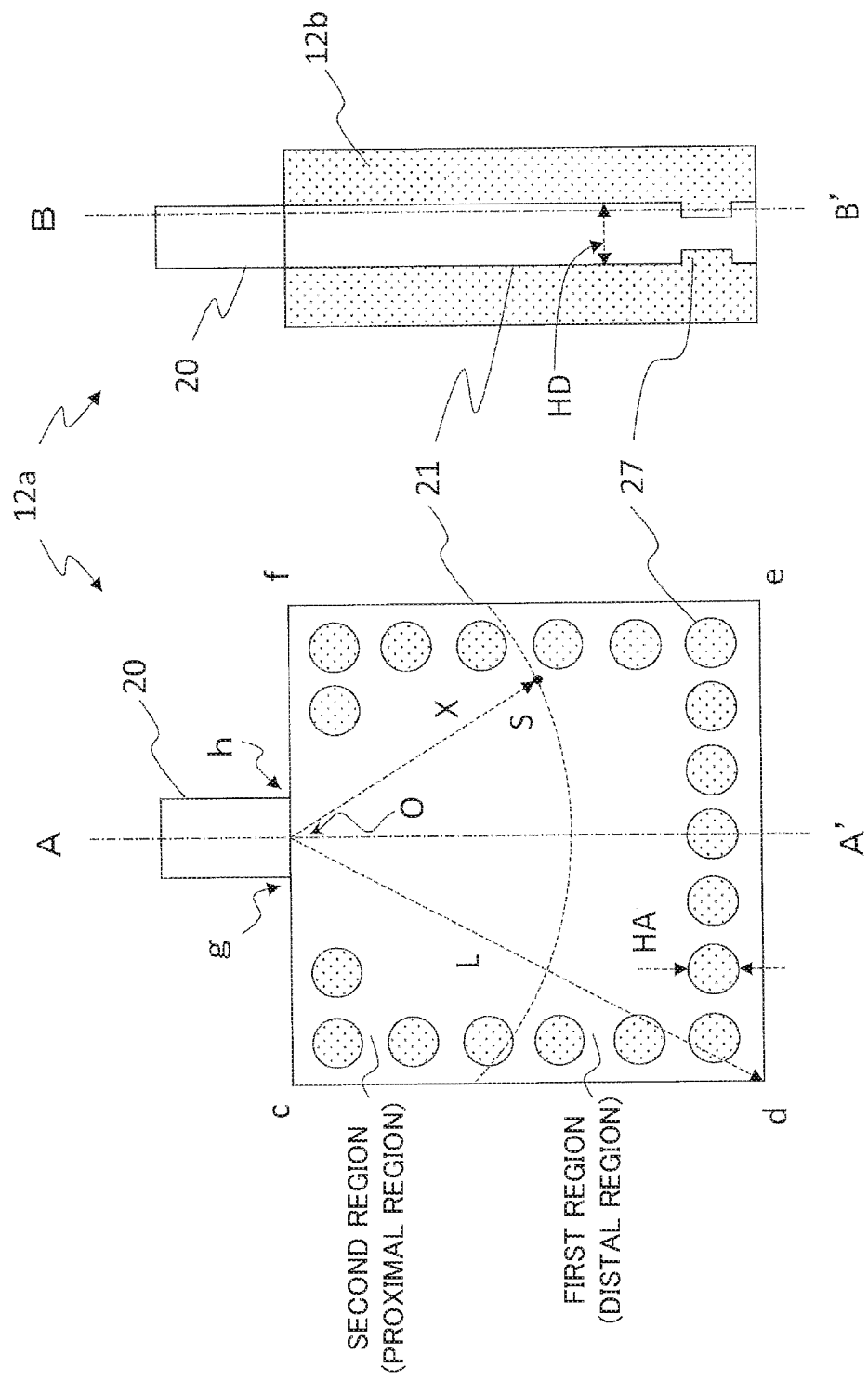

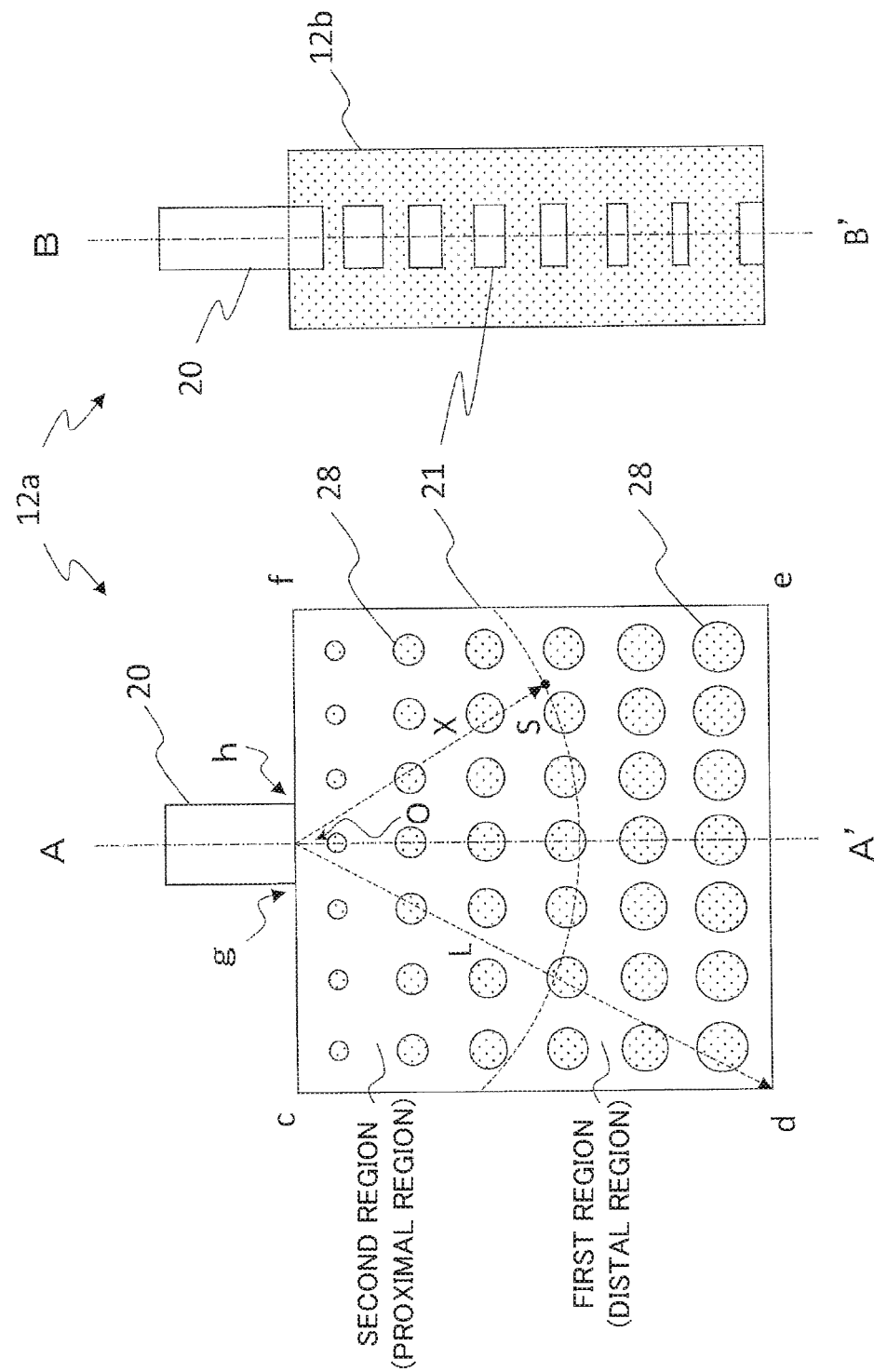

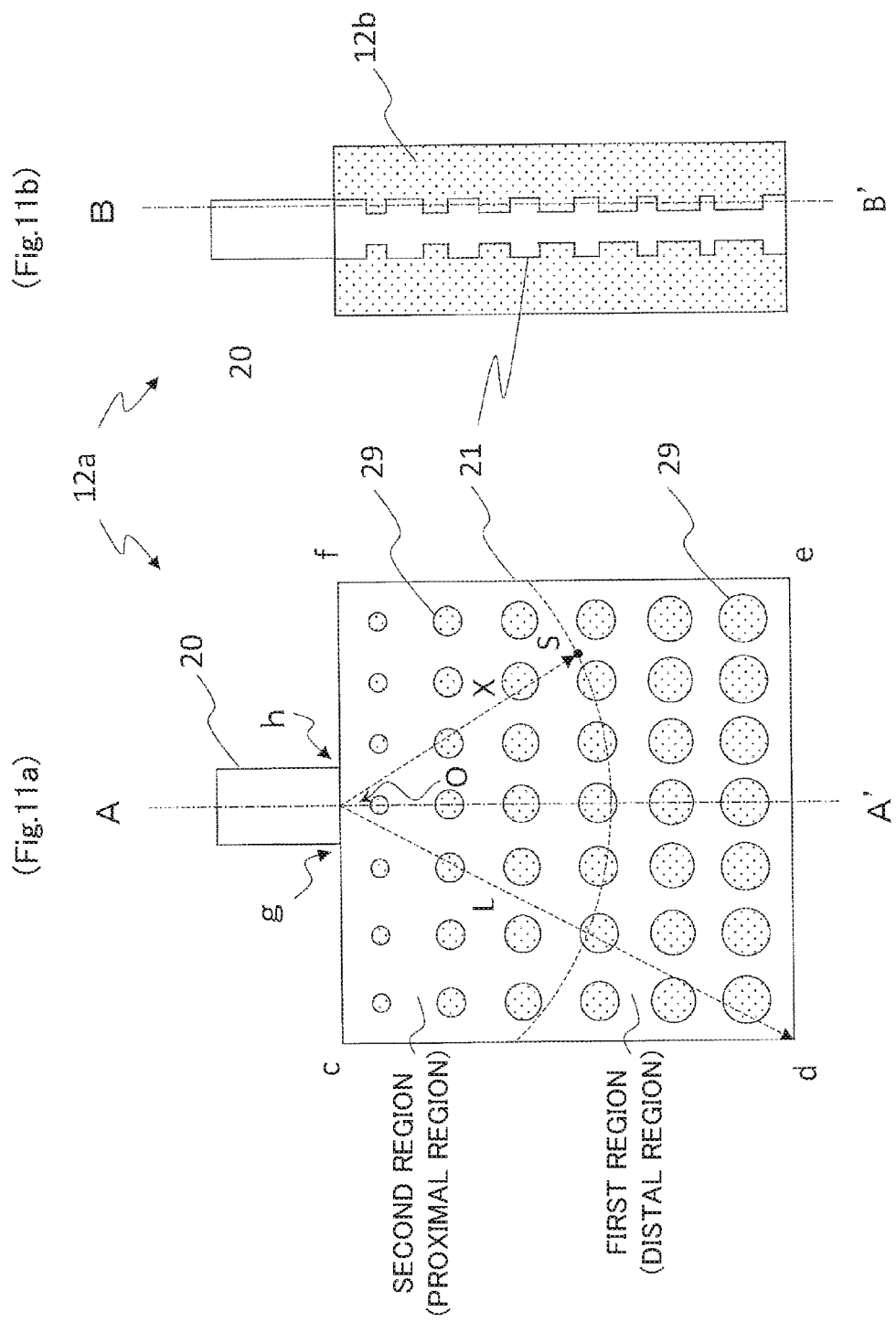

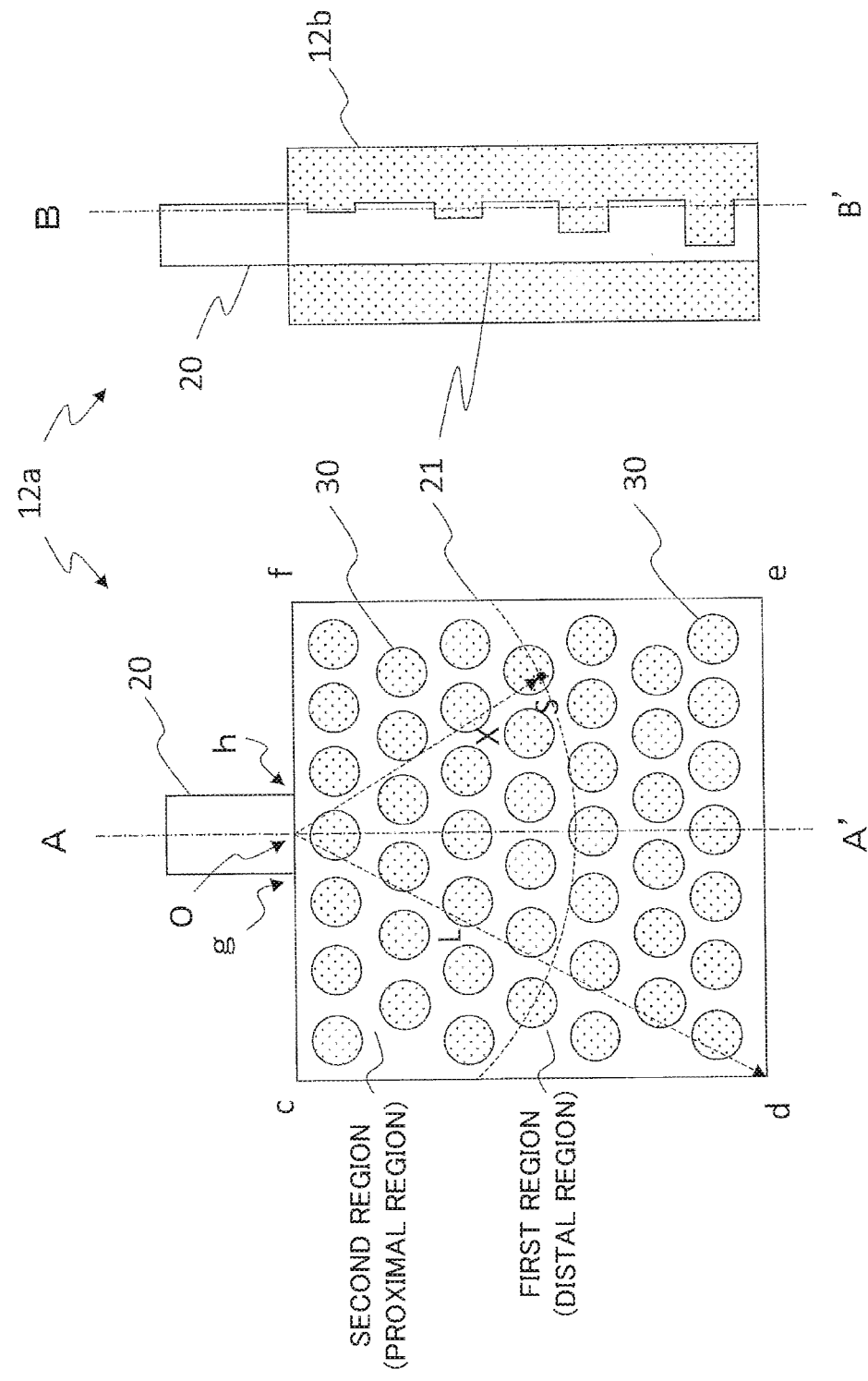

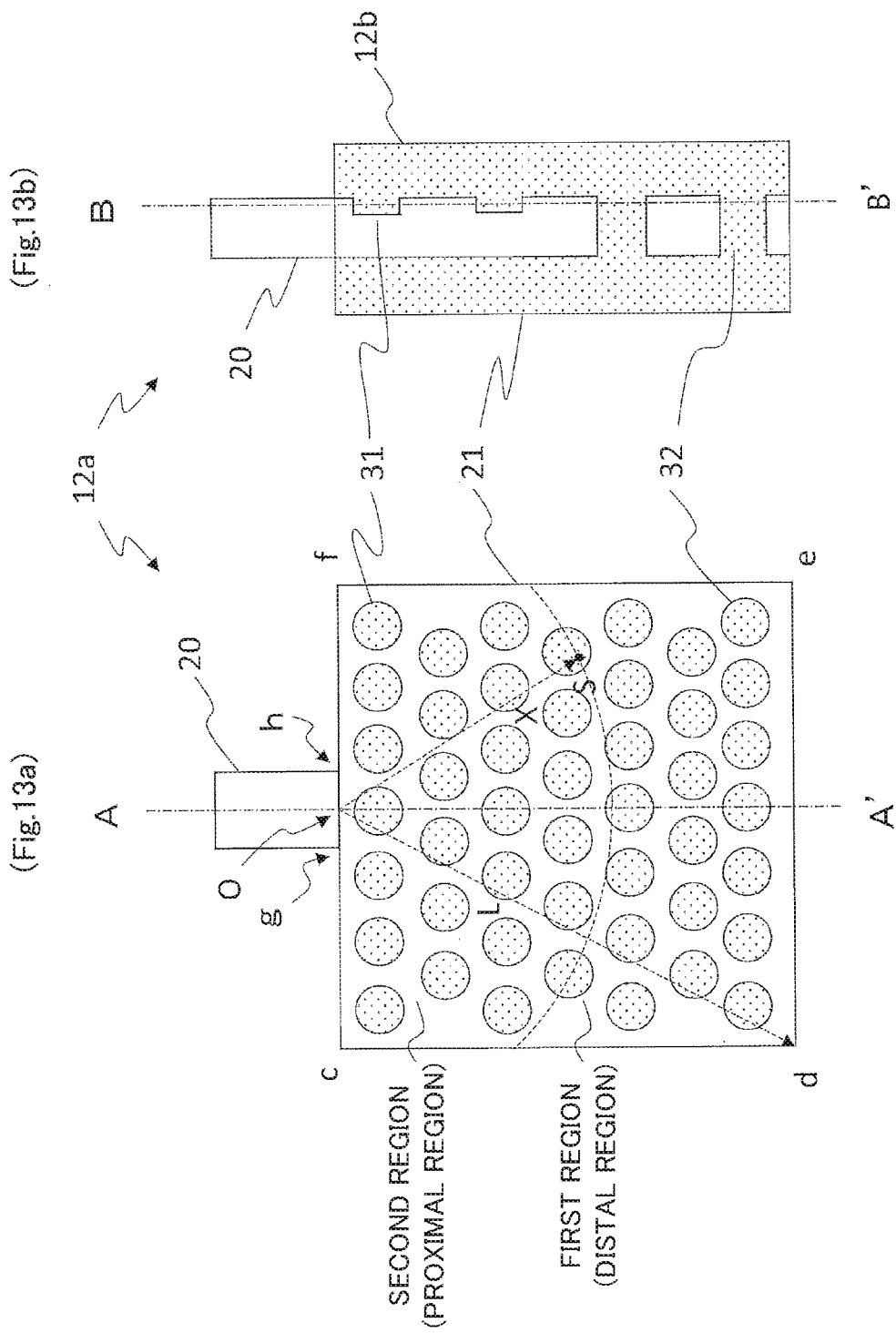

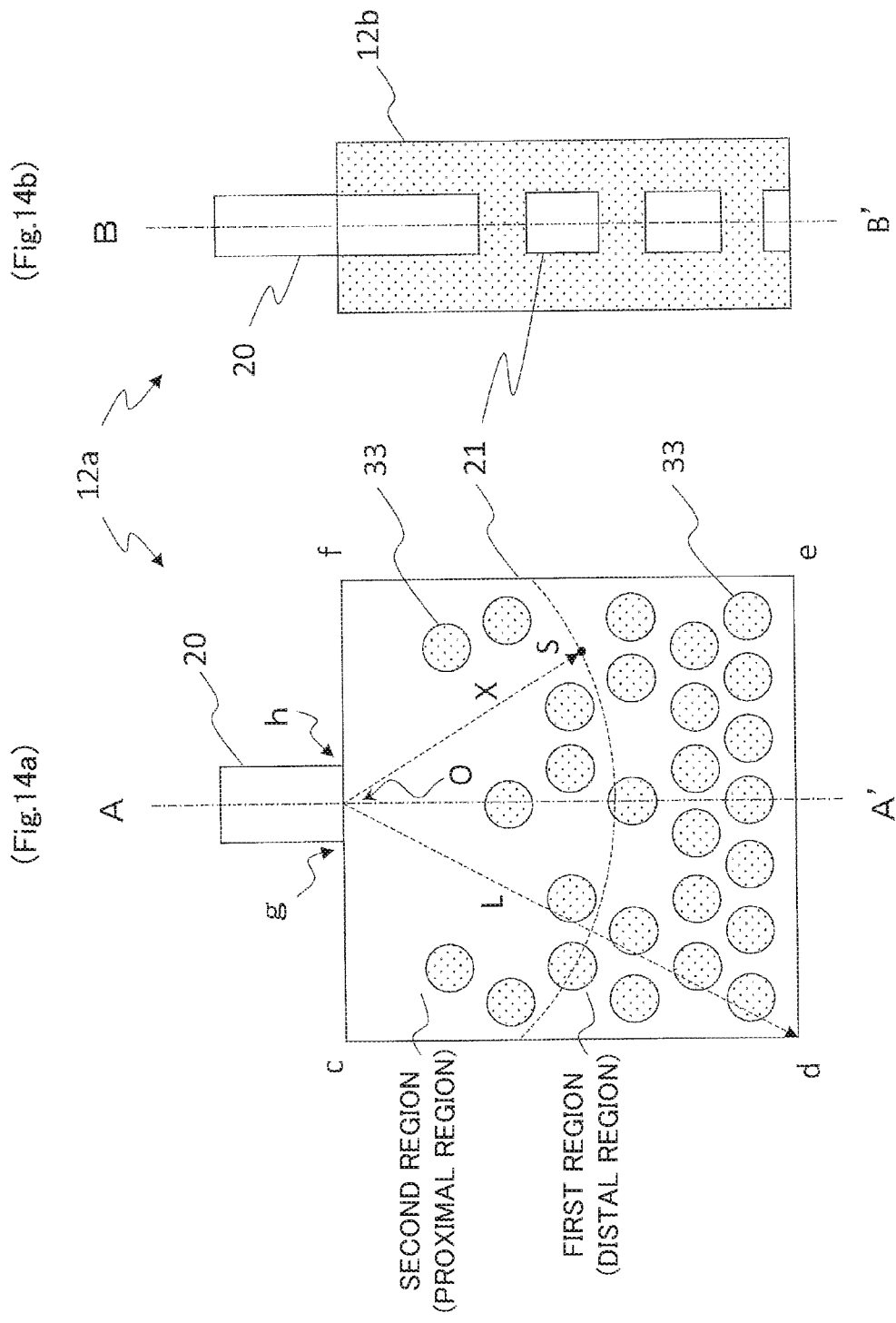

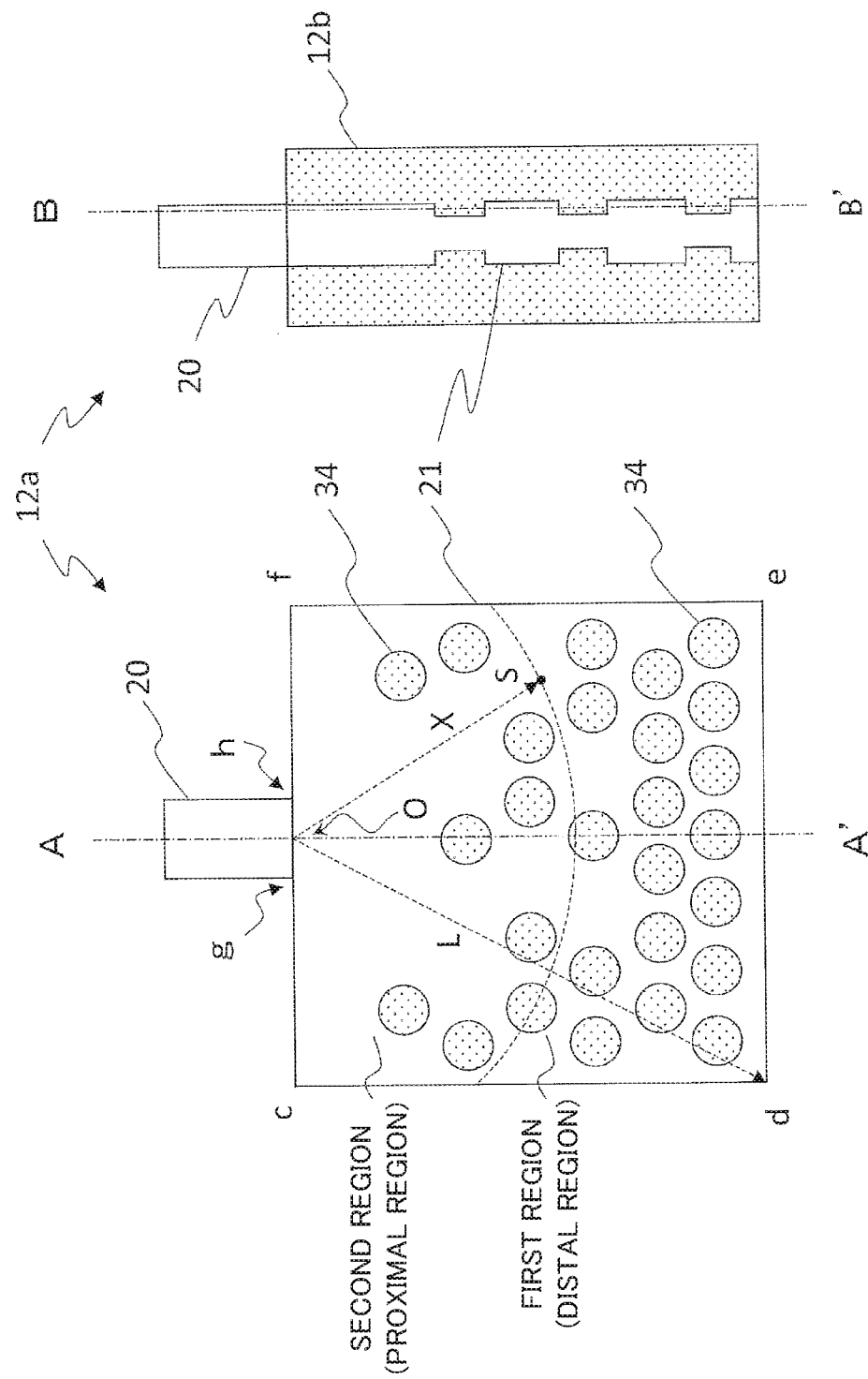

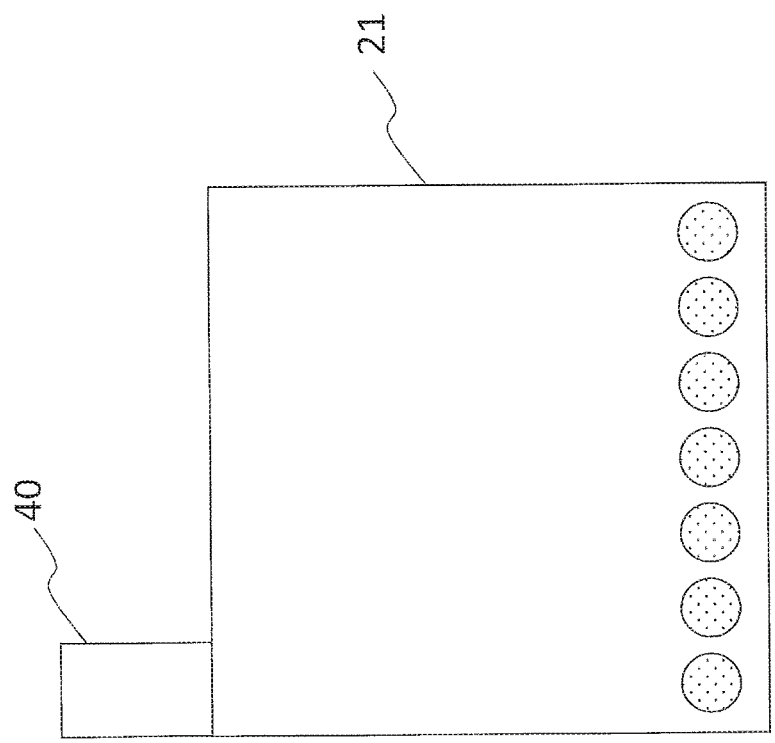

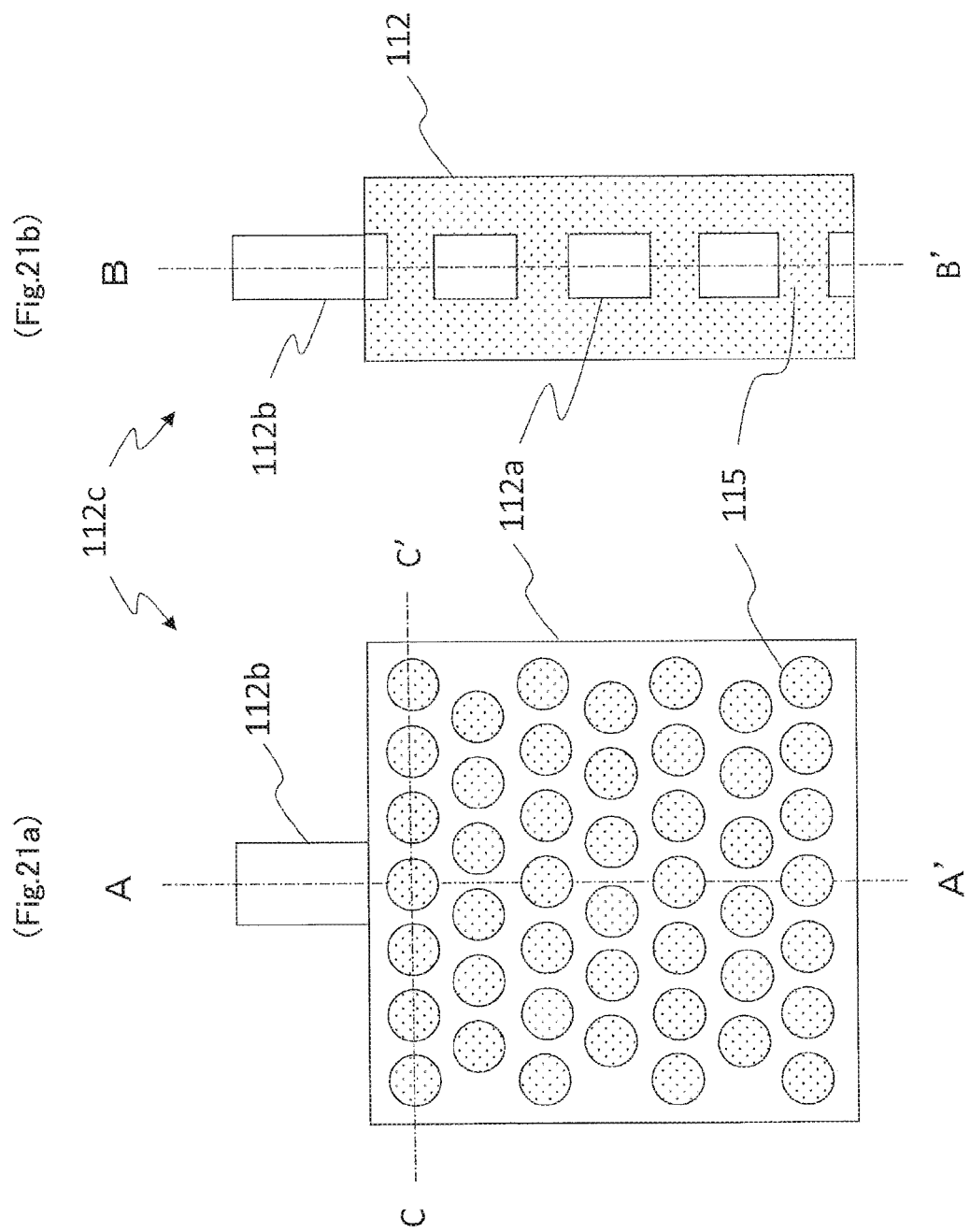

NEGATIVE ELECTRODE FOR METAL-AIR BATTERY

TECHNICAL FIELD

The present disclosure relates to a metal-air battery and a metal negative electrode for use in the metal-air battery.

BACKGROUND ART

In the related art, a variety of metal-air batteries including a metal negative electrode and an air electrode have been proposed. PTL 1 discloses that a zinc material in the form of a sheet or a powder is used as an active material in a negative electrode for a metal-air battery. In a case where the powder is used, for the purpose of increasing the reaction area, the negative electrode is formed by compression-bonding the zinc powder onto a metal sheet or a metal mesh. Furthermore, PTL 2 discloses a metal-air battery having a three-electrode system that includes a metal negative electrode, an air electrode for discharging, and a positive electrode for charging; the metal-air battery is used as a secondary battery.

CITATION LIST

Patent Literature

PTL 1: Japanese Unexamined Patent Application Publication No. 2011-243364
PTL 2: Japanese Unexamined Patent Application Publication No. 2017-174770

SUMMARY OF INVENTION

Technical Problem

As illustrated in FIG. 20, in a metal negative electrode 112c for a metal-air battery, an active material 112 is layered on a current collector 112a. In the metal negative electrode 112c, it is necessary to deliver the electrical charge generated from (or to be consumed in) an electrochemical reaction in the active material 112 to the outside of the battery or supply the electrical charge to the battery, through a lead portion 112b, which is attached to an end portion of the current collector 112a.

As the current collector 112a, an apertured metal plate, such as a mesh or a perforated metal, is sometimes used to ensure adhesion to prevent the active material 112 layered on the current collector 112a from delaminating from the current collector 112a. FIG. 21 illustrates a structure of the metal negative electrode 112c. FIG. 21a is a cross-sectional view of the metal negative electrode 112c taken along line B-B', and FIG. 21b is a cross-sectional view thereof taken along line A-A'.

Referring to FIG. 21a, because of holes 115, which are provided in the current collector 112a, a region is formed in which a cross-sectional area (e.g., the cross-sectional area of the C-C' cross section) of the current collector 112a is small with respect to the direction of the current flow, and, thus, in a case where an electrical charge flows in a planar direction of the current collector 112a, the ohmic resistance increases locally. In particular, in the vicinity of a joining portion for the current collector 112a and the lead portion 112b, the small cross-sectional area of the current collector 112a increases current density, and, therefore, a voltage drop due to the ohmic resistance increases. As a result, the potential difference between a region near the lead portion 112b and a region away from the lead portion 112b increases, which results in a non-uniform electrochemical reaction in a plane of the current collector 112a. Consequently, the metal-air battery has a reduced cycle life and an increased resistance, and, therefore, a problem arises in that the rate characteristics are reduced. On the other hand, in a case where a non-apertured metal plate is used as a current collector, since the current collector has no holes into which the active material can intrude, adhesion between the active material layer and the current collector is reduced, and, therefore, the active material layer may delaminate from the current collector. Consequently, problems also arise in that the metal-air battery has a reduced ohmic resistance, a reduced cycle life, and reduced rate characteristics.

From the standpoint of adhesion between a current collector and an active material layer, it is desirable that the current collector have a hole. However, a hole existing in the vicinity of a lead portion, where the electron current density increases, may cause an increase in the ohmic resistance and a reduction in rate characteristics in the metal negative electrode. In addition, in the metal-air battery, electrochemical reactions take place in a non-uniform manner, which results in a reduced cycle life of the metal-air battery. These problems were not significant in existing current collectors because of their sizes. However, as areas of current collectors have increased, the problems have become more prominent.

The present disclosure is made to solve the problems described above, and an object of the present disclosure is to provide a means for reducing the ohmic resistance in the vicinity of a lead portion while maintaining adhesion between a current collector and an active material.

Solution to Problem

In the present disclosure, a shape of a current collector is configured such that an area where the current collector adheres to (or is in contact with) an active material layer is larger in a region away from a lead portion than in a region near the lead. Accordingly, one or more holes or one or more recesses are provided in the current collector such that a number of the holes or the recesses or a depth of the recesses is greater in a region away from the lead portion than in a region near the lead portion.

Consequently, the reduction in the volume of the current collector due to the formed holes or recesses is greater in the region away from the lead portion than in the region near the lead portion.

More generally speaking, particular attention is paid to a volume reduction ratio of the current collector, the volume reduction being a result of providing the through-holes or the recesses, and a configuration is made such that the reduction ratio of a region away from the lead portion is greater than the reduction ratio of a region near the lead portion.

Accordingly, the present disclosure discloses a metal negative electrode including a current collector and a lead portion. The current collector is in a form of a planar plate that is generally quadrilateral. The lead portion is connected to the current collector with a joining boundary being disposed between the lead portion and the current collector. The current collector includes a through-hole or a recess provided to extend from a front surface of the planar plate toward a back surface of the planar plate. A distance from a midpoint of the joining boundary to a point on a surface of the current collector is designated as a region dividing distance, the point defining a distance less than a maximum distance between the midpoint and a side of the current collector. In the current collector, a first region is a region defined by distances from the midpoint, the distances being a distance equal to the region dividing distance and distances greater than the region dividing distance, and, in the current collector, a second region is a region defined by distances from the midpoint that are less than the region dividing distance. A volume reduction ratio of the first region is greater than a volume reduction ratio of the second region, the volume reduction ratio of the first region being a ratio with respect to a volume of the first region determined assuming that the through-hole or the recess is not present, the volume reduction ratio of the second region being a ratio with respect to a volume of the second region determined assuming that the through-hole or the recess is not present.

Furthermore, the metal negative electrode is as follows. In the current collector, a through-hole that has a generally rectangular shape is provided along a side of the current collector, the side being opposite to the joining boundary.

Furthermore, the metal negative electrode is as follows. In the current collector, through-holes or recesses that are generally circular are provided along a side of the current collector, the side being opposite to the joining boundary.

Furthermore, the metal negative electrode is as follows. In the current collector, through-holes or recesses that are generally circular are provided along at least a portion of sides of the current collector.

Furthermore, the metal negative electrode is as follows. In the current collector, through-holes or recesses that are generally circular are provided such that a location closer to the joining boundary has a smaller diameter through-hole or recess.

Furthermore, the metal negative electrode is as follows. In the current collector, recesses that are generally circular are provided such that a location closer to the joining boundary has a shallower recess.

Furthermore, the metal negative electrode is as follows. In the current collector, through-holes or recesses that are generally circular are provided such that a location closer to the joining boundary has a smaller number of the through-holes or the recesses.

Advantageous Effects of invention

According to the present disclosure, a through-hole or a recess is provided in a region away from a lead portion, and, consequently, adhesion between a current collector and an active material is maintained. On the other hand, in a region near the lead portion, since fewer or no through-holes or recesses are provided, a cross-sectional area of the current collector is maintained without being reduced, and, consequently, the ohmic resistance in the vicinity of the lead portion is reduced. As a result, a reduction in the rate characteristics of a metal-air battery is prevented, which results in an extended cycle life thereof.

BRIEF DESCRIPTION OF DRAWINGS

FIG. 2 is a diagram illustrating a metal negative electrode 12 according to the first embodiment.

FIG. 3 is a diagram illustrating a current collector 21 according to the first embodiment.

FIG. 4 is a diagram illustrating a proximal region and a distal region of the current collector 21 according to the first embodiment.

FIG. 5 is a diagram illustrating a current collector 21 according to a second embodiment.

FIG. 6 is a diagram illustrating a current collector 21 according to a third embodiment.

FIG. 7 is a diagram illustrating a current collector 21 according to a fourth embodiment.

FIG. 8 is a diagram illustrating a current collector 21 according to a fifth embodiment.

FIG. 9 is a diagram illustrating a current collector 21 according to a sixth embodiment.

FIG. 10 is a diagram illustrating a current collector 21 according to a seventh embodiment.

FIG. 11 is a diagram illustrating a current collector 21 according to an eighth embodiment.

FIG. 12 is a diagram illustrating a current collector 21 according to a ninth embodiment.

FIG. 13 is a diagram illustrating a current collector 21 according to a tenth embodiment.

FIG. 14 is a diagram illustrating a current collector 21 according to an eleventh embodiment.

FIG. 15 is a diagram illustrating a current collector 21 according to a twelfth embodiment.

FIG. 16 is a diagram illustrating a lead portion 40, which is provided at an end portion of a current collector 21.

FIG. 21 is a diagram illustrating a shape of a current collector 112a, according to the related art.

DESCRIPTION OF EMBODIMENTS

Figure 1:
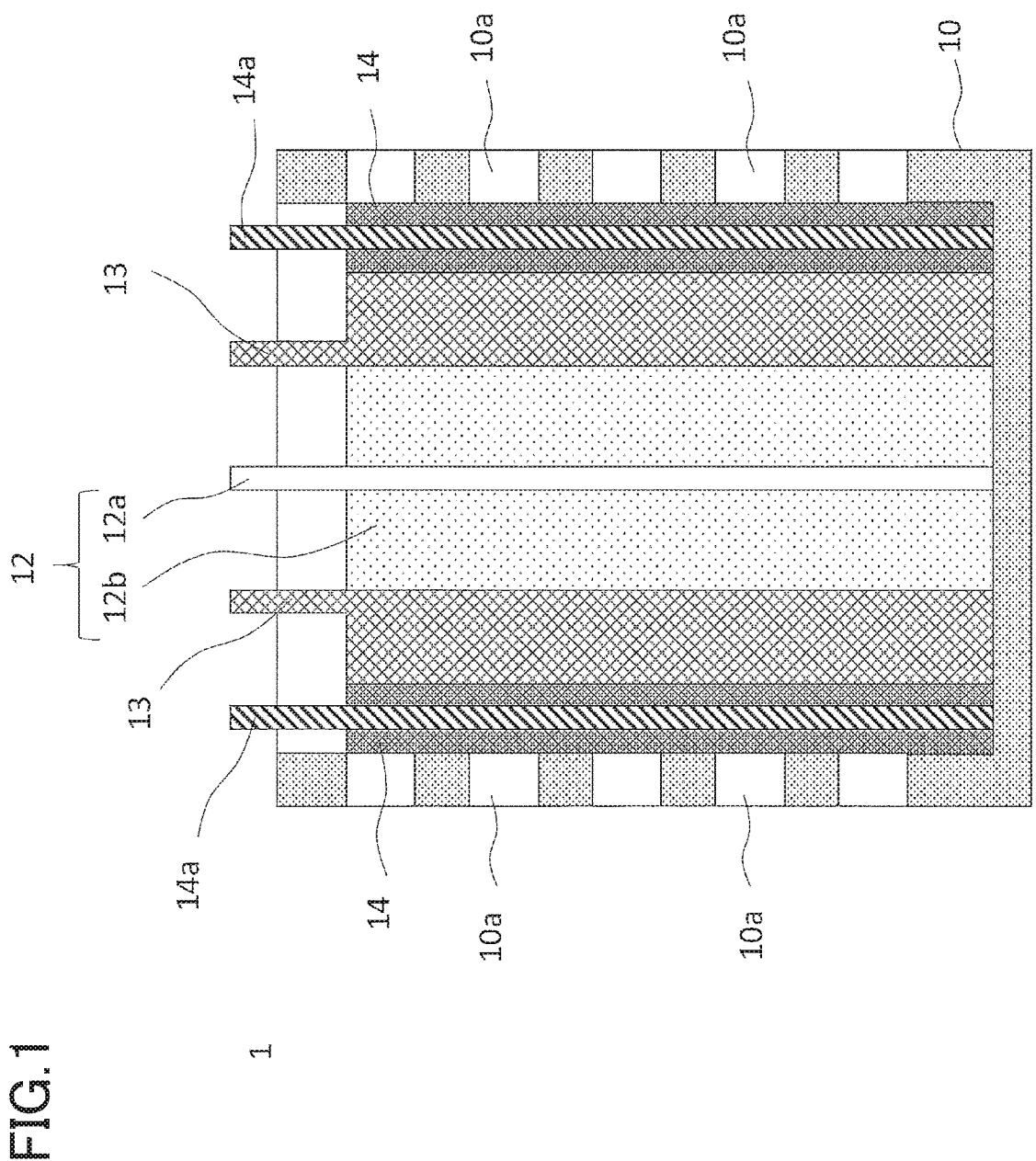
FIG. 1 is an overall view of a metal-air battery 1 according to a first embodiment.

Embodiments of the present disclosure will now be described in detail with reference to the drawings. Note that the same reference characters will be used throughout the drawings to refer to the same or like parts, and a description thereof will not be repeated.

First Embodiment

FIG. 1 is a cross-sectional view of a structure of a metal-air battery according to a first embodiment of the present disclosure.

A metal-air battery according to the first embodiment is a metal-air secondary battery having a three-electrode system and includes a metal negative electrode (negative electrode) 12, a charging electrode 13, and an air electrode 14, which are disposed parallel to one another in a housing (battery housing) 10. The metal negative electrode 12 includes a metal that serves as an electrode active material. The charging electrode 13 is used as a positive electrode in charging. The air electrode 14 is used as a positive electrode in discharging. As illustrated in FIG. 1, in the metal-air battery 1 according to the first embodiment, a liquid electrolyte is held in a state in which the liquid electrolyte wets the metal negative electrode 12, the charging electrode 13, and the air electrode 14. Reference character 12a denotes a metal negative electrode current collector, and reference character 14a denotes as air electrode current collector.

Examples of the metal-air battery 1 include zinc-air batteries, lithium-air batteries, sodium-air batteries, calcium-air batteries, magnesium-air batteries, aluminum-air batteries, and iron-air batteries.

In the metal-air battery 1 according to the first embodiment, the charging electrode 13 is disposed between the air electrode 14 and the metal negative electrode 12, as illustrated in FIG. 1. In this configuration, in discharging, the discharging is carried out by the air electrode 14 and the metal negative electrode 12 with no interference from the charging electrode 13, and, in charging, the charging is carried out by the charging electrode 13 and the metal negative electrode 12.

Now, each of the components that constitute the metal-air battery 1 will be described in detail.

Description of Housing 10

The housing 10 is a tank for storing therein the metal negative electrode 12, the charging electrode 13, and the air electrode 14, which are wetted with the liquid electrolyte. A material for forming the housing 10 is not particularly limited provided that the material exhibits corrosion resistance with respect to the liquid electrolyte. Examples of the material include polyvinyl chloride (PVC), polyvinyl acetate, ABS resins, vinylidene chloride, polyacetals, polyethylene, polypropylene, polyIsobutylene, fluorocarbon resins, and epoxy resins.

The housing 10 includes, in a side face thereof, an opening 10a for taking in air necessary for the discharge reaction. Furthermore, the housing 10 may also include an opening for releasing gas (oxygen) generated during charging. A liquid-repellent porous sheet may be disposed between the air electrode 14 and the opening 10a or outside of the opening 10a to inhibit leakage of the liquid electrolyte. The liquid-repellent porous sheet is not particularly limited provided that the liquid-repellent porous sheet is one commonly used in this field. Examples thereof include sheets formed of a fluorocarbon resin, such as polytetrafluoroethylene (PTFE).

Description of Air Electrode 14

The air electrode 14 is not particularly provided that the air electrode 14 functions as an air electrode of the metal-air battery. The air electrode 14 is a porous electrode that includes an oxygen reduction catalyst and serves as a positive electrode in discharging. The air electrode 14 may include a porous gas diffusion layer that includes a carbon material and a porous catalyst layer provided on the gas diffusion layer. Furthermore, the air electrode 14 may include a current collecting electrode that is in contact with the catalyst layer.

In the air electrode 14, in a case where an alkaline aqueous solution is used as the liquid electrolyte, a discharge reaction occurs in which water supplied from the liquid electrolyte and the like, oxygen gas supplied from the atmosphere, and electrons react with one another on the oxygen reduction catalyst to form hydroxide ions (OH⁻). That is, in the air electrode 14, the discharge reaction proceeds at a three-phase interface where oxygen (a gas phase), water (a liquid phase), and an electronic conductor (a solid phase) coexist.

$$O_2+2H_2O+4e^-\rightarrow 4OH^-$$ [Chem. 1]

The air electrode 14 is provided such that oxygen gas present in the atmosphere can be diffused into the air electrode 14. For example, the air electrode 14 can be provided such that at least a portion of a surface of the air electrode 14 can be exposed to the atmosphere. In the metal-air battery 1 illustrated in FIG. 1, the opening 10a is provided in the housing 10, and oxygen gas present in the atmosphere can be diffused into the air electrode 14 through the opening 10a. Note that water may be supplied into the air electrode 14 through the opening 10a.

The catalyst layer may include, for example, an electroconductive porous support, an oxygen reduction catalyst supported on the porous support, and a binding agent for binding the porous support. Accordingly, the three-phase interface where oxygen gas, water, and electrons coexist can be formed on the oxygen reduction catalyst, and, therefore, the discharge reaction can be allowed to proceed. Examples of a material used in the electroconductive porous support include electroconductive carbons, such as Ketjen black, acetylene black, Denka black, carbon nanotubes, and fullerenes; one or more of these may be used. Furthermore, the oxygen reduction catalyst may be made of a metal, such as platinum, or a metal oxide, such as manganese oxide. The binder may be any of a variety of materials; preferred materials include polyvinylidene fluoride and polytetrafluoroethylene. In a case where polyvinylidene fluoride or polytetrafluoroethylene is used as the binding agent, the catalyst layer has improved liquid repellency.

In addition, the catalyst layer may include an oxygen evolution catalyst that has the ability to evolve oxygen. When the catalyst layer includes an oxygen evolution catalyst, the air electrode 14 can be used as a positive electrode both in discharging and in charging, and, therefore, the charging electrode 13, which will be described later, may not be provided.

Furthermore, the air electrode 14 can be electrically connected to a terminal (not illustrated) for the air electrode. Accordingly, the electrical charge generated in the catalyst layer can be delivered to an external circuit (not illustrated).

Description of Charging Electrode 13

The charging electrode 13 is a porous electrode that serves as a positive electrode in charging. In the charging electrode 13, in a case where an alkaline aqueous solution is used as the liquid electrolyte, a reaction (charge reaction) occurs in which oxygen, water, and electrons are formed from hydroxide ions (OH⁻). That is, in the charging electrode 13, the charge reaction proceeds at a three-phase interface where oxygen (a gas phase), water (a liquid phase), and an electronic conductor (a solid phase) coexist.

$$4OH^-\rightarrow O_2+2H_2O+4e^-$$ [Chem. 2]

Furthermore, the charging electrode 13 has a surface that is corrosion-resistant with respect to the liquid electrolyte. Furthermore, it is preferable that the charging electrode 13 be formed of a structure or a material that enables ion conduction in a direction perpendicular to a plane that faces the metal negative electrode 12; preferably, the charging electrode 13 is a porous metal plate or the like. For example, it is preferable that the porous metal plate be in the form of a mesh, a foam, or the like. Furthermore, it is preferable that a material of a surface of the porous metal plate be copper, stainless steel, nickel, tin, or the like.

Furthermore, the charging electrode 13 can be electrically connected to a charging electrode terminal (not illustrated). Accordingly, the electrical charge necessary for a charge reaction can be supplied to the charging electrode 13 from an external circuit (not illustrated).

Description of Metal Negative Electrode 12

The metal negative electrode 12 is an electrode having a configuration that includes a metal negative electrode current collector 12a and a negative electrode active material layers 12b layered thereon. The negative electrode active material layers 12b include an active material that includes a metal element. In discharging, an oxidation reaction of the active material occurs, and, in charging, a reduction reaction of the active material occurs. The metal element may be zinc, lithium, sodium, calcium, magnesium, aluminum, iron, or the like. When the metal element is zinc, the following reduction reaction of the metallic zinc occurs in discharging.

$$Zn+4OH^- \rightarrow Zn(OH)_4^{2-}+2e^-$$

$$Zn+2OH^- \rightarrow ZnO+H_2O+2e^-$$

$$Zn+2OH^- \rightarrow Zn(OH)_2+2e^- \quad \text{[Chem. 3]}$$

That is, the oxidized zinc is, in some cases, zincate ions dissolved in the liquid electrolyte or, in other cases, zinc oxide or zinc hydroxide that is directly formed. Note that the zincate ions that are formed may precipitate as zinc oxide or zinc hydroxide in the liquid electrolyte as described in the chemical formulae below.

$$Zn(OH)_4^{2-} \rightarrow ZnO+2OH^-+H_2O$$

$$Zn(OH)_4^{2-} \rightarrow Zn(OH)_2+2OH^- \quad \text{[Chem. 4]}$$

On the other hand, in charging, a reduction reaction in which metallic zinc is formed occurs as described below.

$$Zn(OH)_4^{2-}+2e^- \rightarrow Zn+4OH^-$$

$$ZnO+H_2O+2e^- \rightarrow Zn+2OH^-$$

$$Zn(OH)_2+2e^- \rightarrow Zn+2OH^- \quad \text{[Chem. 5]}$$

That is, in some cases, zincate ions dissolved in the liquid electrolyte are reduced to form zinc, and, in other cases, zinc oxide or zinc hydroxide is directly reduced to zinc.

As described above, in both the discharge reaction and the charge reaction, reactions involving hydroxide ions ($OH^-$) in addition to the active material (zinc) occur, and, therefore, the metal negative electrode 12 needs to have a structure in which the active material and the liquid electrolyte, which serves as a conduction path for the hydroxide ions ($OH^-$), efficiently come in contact with each other. For example, the negative electrode active material layers 12b may be porous electrodes formed of active material particles, and, by employing this configuration, the contact interface between the active material particles and the liquid electrolyte can be increased because the liquid electrolyte diffuse into the voids between the particles of the active material particles. Furthermore, the negative electrode active material layers 12b may include a binder. Inclusion of a binder enables the active material to be bound together. The binder that may be included in the negative electrode active material layers 12b may be a binder that can be used as the binder that may be included in the catalyst layer of the air electrode 14. Furthermore, the negative electrode active material layers 12b may include a conductive additive. Examples of the conductive additive include electroconductive carbons, electroconductive ceramics, metals, such as bismuth, indium, lead, tin, aluminum, and calcium, and oxides of the foregoing metals; one or more of these may be used.

Furthermore, the active material may be a metal in a reduced state or a metal in an oxidized state. When the metal element zinc, the zinc is, in a reduced state, metallic zinc and, in an oxidized state, zinc oxide.

Metal Negative Electrode Current Collector 12a

From the standpoint of inhibiting self-corrosion, it is desirable that the metal negative electrode current collector 12a include a material having a high hydrogen overvoltage or a material formed of a metal base material, such as stainless steel, and a coating applied on a surface thereof; the coating may include nickel, tin, or the like, which has a high hydrogen overvoltage.

FIG. 2 illustrates a structure of the metal negative electrode 12. The metal negative electrode current collector 12a is formed of a lead portion 20 and a current collector 21. The layered negative electrode active material layers 12b adhere to both surfaces of the metal negative electrode current collector 12a.

Current Collector 21

FIG. 3a illustrates a connection relationship between the lead portion 20 and the current collector 21. The current collector 21 is formed of a piece of metal that has a thickness HD and is generally quadrilateral (e.g., in the first embodiment, the piece of metal is quadrilateral, with each of the sides being substantially a straight line). For convenience, the respective vertices of the current collector 21, as viewed in a direction perpendicular to a major surface thereof, are designated as c, d, e, and f. Furthermore, boundary points on a side cf of the current collector 21 at which the current collector 21 is electrically joined to the lead portion 20 are designated as g and h (hereinafter referred to as a joining boundary gh, which is defined by the joining boundary points at which the current collector 21 is joined to the lead portion 20). Furthermore, a midpoint of the joining boundary gh is designated as O, and the midpoint O is also a midpoint of the side cf. That is, the joining boundary gh is located at the middle of the side cf.

Note that the lead portion 20 and the current collector 21 may be made of the same material and may be in the form of a one-piece body. In such a case, the joining boundary gh and the midpoint O are virtually provided for convenience, for later discussion.

Through-Hole 22

As illustrated in FIG. 3a, a through-hole 22 is provided in the current collector 21, near and along a side de, which is opposite to the joining boundary gh. The through-hole 22 extends through the current collector 21, from a front surface that is a major surface of a planar plate of the current collector 21 toward a back surface thereof (in a thickness direction of the current collector). A cross-sectional shape of the through-hole 22 is approximately rectangular. Note that to simplify the description, it is assumed that the through-hole 22 is formed to extend perpendicular to a planar direction of the current collector 21. The same applies to through-holes or recesses presented in second to twelfth embodiments.

Because of the through-hole 22 provided in the current collector 21 that is in the form of a planar plate, an area where the current collector 21 is in contact with the negative electrode active material layers 12b is increased. Furthermore, the negative electrode active material layers 12b layered on both surfaces of the current collector 21 are integrated via the through-hole 22. Hence, an effect of increasing adhesion between the current collector 21 and the negative electrode active material layers 12b is produced.

Furthermore, because of the through-hole 22 provided in the current collector 21 that is in the form of a planar plate, the liquid electrolyte stored in the metal-air battery 1 can move through the negative electrode active material layers 12b and the through-hole 22. Hence, the following effect is produced: when the liquid electrolyte is introduced into the metal-air battery 1, the liquid surfaces of the liquid electrolyte on the front surface side and the back surface side of the current collector 21 can be at comparable positions. Furthermore, when the liquid electrolyte is introduced, air bubbles present in the liquid electrolyte can be discharged to a liquid surface of the liquid electrolyte even in a case where the current collector has a complex shape.

In addition, while the metal-air battery 1 is charged, the liquid electrolyte can move through the negative electrode active material layers 12*b* and the through-hole 22, and, therefore, an adjustment is achieved such that the difference between the levels of the liquid electrolyte on the front surface side and the back surface side of the current collector 21 is reduced. Accordingly, a uniform charge reaction can be achieved in the metal-air battery 1 of the first embodiment.

The through-hole 22 has a long side and a short side, which have a length HW and a length HH, respectively. The through-hole 22 has a depth equal to the thickness of the current collector 21, that is, the through-hole 22 has a depth HD. FIG. 3*a* and FIG. 3*b* illustrate a shape of the current collector 21. FIG. 3*a* is a cross-sectional view of the lead portion 20 and the current collector 21 taken along line and FIG. 3*b* is a cross-sectional view thereof taken along line A-A'.

Region Dividing Distance, First Region, and Second Region

As illustrated in FIG. 4, the maximum distance of the distances between the midpoint 0 and the sides (the perimeter defined by the vertices c, d, e, and f) of the current collector 21 is a distance L (hereinafter referred to as a maximum distance L) between the midpoint 0 and the vertex d. Further, an arbitrary point that is on a surface of the current collector 21 and defines a distance from the midpoint O less than the maximum distance L is designated as S. The distance from the midpoint O to the point S is designated as X (hereinafter referred to as a region dividing distance X).

In the current collector 21, a region defined by distances from the midpoint O, the distances being a distance equal to the distance X and distances greater than the distance X, is designated as a first region (hereinafter referred to as a distal region). In the current collector 21, a region defined by distances from the midpoint O that are less than the distance X is designated as a second region (hereinafter referred to as a proximal region). In FIG. 4, the distance X is less than a separation distance from the midpoint O to the through-hole 22, and, therefore, the through-hole 22 is included in the distal region, that is, the through-hole 22 does not belong to the proximal region.

Comparison of Volume Reduction Ratio Between Regions

Now, volume reduction ratios of the proximal region and the distal region are discussed, the volume reduction being a result of providing the through-hole 22 in the current collector 21. Note that the volume of the proximal region is a volume of the proximal region determined by virtually cutting the proximal region from the current collector 21. Similarly, the volume of the distal region is a volume of the distal region determined by virtually cutting the distal region from the current collector 21.

Although the through-hole 22 is provided in the current collector 21 as a whole, there is no volume reduction in the portion corresponding to he proximal region because, as described above, the through-hole 22 is not included in the proximal region. Accordingly, the volume reduction ratio of the proximal region of the current, collector 21 is zero.

On the other hand, the volume of the distal region is reduced by an amount corresponding to the volume of the through-hole 22 (=long side HW×short side HH×depth HD). Accordingly, with the through-hole 22 provided in the current collector 21, the volume reduction ratio of the distal region increases by an amount corresponding to the volume of the through-hole 22.

Accordingly, when the volume reduction ratios of the proximal region and the distal region associated with the case in which the through-hole 22 is provided in the current collector 21 are compared, the reduction ratio of the distal region is greater than the reduction ratio of the proximal region. That is, the reduction in the volume of the current collector 21 is greater in the distal region than in the proximal region.

In the first embodiment, in the current collector 21, the through-hole 22 is provided near and along the side de, which is opposite to the joining boundary gh. Thus, the area where the current collector adheres to (or is in contact with) the active material layers is increased in a region away from the lead portion compared with a region near the lead.

As a method for quantitatively expressing this invention, the current col lector 21 is virtually divided into the distal region and the proximal region by using the region dividing distance X as the boundary, and, based on this, particular attention is paid to the volume reduction ratio of the current collector, the volume reduction being a result of providing the through-hole 22 (in the second and subsequent embodiments, providing through-holes or recesses), and, thus, the expression "the reduction ratio of the current collector 21 in the distal region is greater than the reduction ratio of the current collector 21 in the proximal region" is employed.

Effects

In the first embodiment, at or near the joining boundary gh, which is defined with the lead portion 20, the current collector 21 has its original thickness HD, and, therefore, a cross-sectional area of the current collector 21 is not reduced. Accordingly, current flowing through the current collector 21 toward the lead portion 20 is not obstructed, and, therefore, the maximization of the current density near the lead portion 20 is inhibited. Hence, the ohmic resistance that occurs in the metal negative electrode 12 is reduced, and an associated voltage drop is inhibited. In addition, extension of the cycle life of the metal-air battery and an improvement in the rate characteristics thereof can be achieved.

The through-hole 22 is provided exclusively in the distal region, and, thus, the area where the current collector 21 is in contact with the negative electrode active material layers 12*b* is increased. Accordingly, adhesion between the current collector 21 and the negative electrode active material layers 12*b* is maintained. Hence, the concern that the negative electrode active material layers 12*b* may delaminate from the current collector can be overcome.

In other words, in the related art, the holes 115 are provided across the entire surface of the current collector 112*a* as illustrated in FIG. 21, whereas, in the first embodiment, the through-hole 22 is provided exclusively in the distal region. Hence, in the distal region, adhesion between the current collector 21 and the negative electrode active material layers 12*b* is maintained. On the other hand, in the proximal region, no through-hole 22 is disposed, and, therefore, a cross-sectional area of the current collector is not reduced, and current flowing through the current collector 21 is not obstructed. Hence, the maximization of the current density near the lead portion 20 is inhibited, and also, the negative electrode active material layers 12b are prevented from delaminating from the current collector 21.

Second Embodiment

In the second embodiment, recesses 23 are provided in the same position as in the first embodiment.

FIG. 5a and FIG. 5b illustrate a shape and positions of the recesses 23. FIG. 5a is a cross-sectional view of the lead portion 20 and the current collector 21 taken along line B-B', and FIG. 5b is a cross-sectional view thereof taken along line A-A'.

The recesses 23 are provided in both surfaces of the current collector 21 and have the same size. The positions of the recesses 23 and the lengths of the long side and the short side thereof are the same as those of the through-hole 22.

FIG. 5c is an enlarged view of the portion indicated by reference character DTL in FIG. 5b and is a cross-sectional view of the recesses 23. As illustrated in FIG. 5c, both of the two recesses 23, which are provided in the front and back of the current collector 21, have a depth CD.

In this case, the volume of the distal region is reduced by an amount corresponding to the volume of the recesses 23 (=long side HW×short side HH×depth CD×2 (the number of the recesses 23)). Accordingly, with the recesses 23 provided in the current collector 21, the volume reduction ratio of the distal region decreases by an amount corresponding to the volume of the recesses 23.

Accordingly, when the volume reduction ratios of the proximal region and the distal region associated with the case in which the recesses 23 are provided in the current collector 21 are compared, the reduction ratio of the distal region is greater than the reduction ratio of the proximal region.

Effects

The second embodiment has an effect of maintaining a strength of the current collector 21, in addition to the effects of the first embodiment. In contrast to the first embodiment in which the through-hole is provided, in the second embodiment, the recesses are provided instead of a through-hole, and, therefore, a strength of the current collector 21 against external force (stress) can be maintained.

Third Embodiment

In the third embodiment, a plurality of through-holes 24, which have a cylindrical shape with a diameter HA, are provided. The plurality of through-holes 24 are provided linearly, near and along the side de, which is opposite to the joining boundary gh. FIG. 6a and FIG. 6b illustrate a shape of the current collector 21. FIG. 6a is a cross-sectional view of the lead portion 20 and the current collector 21 taken along line B-B', and FIG. 6b is a cross-sectional view thereof taken along line A-A'.

Comparison of Volume Reduction Ratio Between Regions

Now, the degrees of volume reduction in the proximal region and the distal region are discussed, the volume reduction being a result of providing the plurality of through-holes 24 in the current collector 21.

Here, an assumption is made that a point S is set at the same position as in the first embodiment. As with the first embodiment, although the through-holes 24 are provided in the current collector 21 as a whole, the volume is not reduced in the proximal region because the through-holes 24 are not included in the proximal region.

On the other hand, the volume of the distal region is reduced by an amount corresponding to the volume of the plurality of through-holes 24 provided. For reference, the volume is calculated. An assumption is made that n through-holes 24 having a cylindrical shape and a diameter HA are provided in the current collector 21. In this case, the volume of the n through-holes 24 is (volume=$\pi \times$((diameter HA of through-holes 24)/2)$^2 \times$depth HD×number n).

Thus, the volume of the distal region is reduced by an amount corresponding to the volume of the plurality of through-holes 24. Accordingly, the volume reduction ratio of the distal region increases by an amount corresponding to the volume of the plurality of through-holes 24 provided.

Accordingly, when the volume reduction ratios of the proximal region and the distal region associated with the case in which the plurality of through-holes 24 are provided in the current collector 21 are compared, the reduction ratio of the distal region is greater than the reduction ratio of the proximal region. That is, the reduction in the volume of the current collector 21 is greater in the distal region than in the proximal region.

Effects

Effects similar to those of the first embodiment can be produced.

Fourth Embodiment

In the fourth embodiment, recesses 25, which are cylinders with a diameter HA and a depth CD, are provided in both surfaces of the current collector 21, at the same positions as in the third embodiment.

FIG. 7a and FIG. 7b illustrate a shape and positions of the recesses 25. FIG. 7a is a cross-sectional view of the lead portion 20 and the current collector 21 taken along line B-B', and FIG. 7b is a cross-sectional view thereof taken along line A-A'.

FIG. 7c is an enlarged view of the portion indicated by reference character DTL in FIG. 7b and is a cross-sectional view of the recesses 25. As illustrated in FIG. 7c, both of the two recesses 25, which are provided in the front and back of the current collector 21, have a depth CD.

In this case, when the volume of the distal region is calculated, it is found that the volume is reduced by an amount corresponding to the volume of the plurality of recesses 25. For reference, the volume of n recesses 25, which are provided in the front and back of the current collector 21, is (volume=$\pi \times$((diameter HA of recesses 25)/2)$^2 \times$depth CD×number n×2 for front and back).

Thus, as illustrated in FIG. 7a, the plurality of recesses 25 are provided in the current collector 21, near and along the side de, which is opposite to the joining boundary gh, and, accordingly, the volume reduction ratio of the distal region is increased.

Accordingly, when the volume reduction ratios of the proximal region and the distal region associated with the case in which the plurality of recesses 25 are provided in the current collector 21 are compared, the reduction ratio of the distal region is greater than the reduction ratio of the proximal region.

Effects

Effects similar to those of the second embodiment can be produced.

Fifth Embodiment

In the fifth embodiment, a plurality of through-holes 26 are provided along each of the sides of the current collector. The through-holes 26 have the same shape as the through-holes 24 of the third embodiment, which have a cylindrical shape with the diameter HA. The through-holes 26 are arranged at approximately regular intervals. It should be noted that no through-holes 26 are provided in the vicinity of the joining boundary gh. FIG. 8a and FIG. 8b illustrate a shape of the current collector 21. FIG. 8a is a cross-sectional view of the lead portion 20 and the current collector 21 taken along ling B-B', and FIG. 8b is a cross-sectional view thereof taken along line A-A'.

Comparison of Volume Reduction Ratio Between Regions

Now, the degrees of volume reduction in the proximal region and the distal region are discussed. The through-holes 26 are arranged substantially uniformly at approximately regular intervals along each of the sides except for the vicinity of the joining boundary gh. Accordingly, the number of the through-holes 26 is greater in the distal region than in the proximal region. Since the through-holes 26 have the same volume, the reduction in volume is greater in the distal region than in the proximal region.

Thus, when the volume reduction ratios of the proximal region and the distal region in the fifth embodiment are compared, the reduction ratio of the distal region is greater than the reduction ratio of the proximal region.

Effects

Effects similar to those of the first embodiment can be produced.

Sixth Embodiment

In the sixth embodiment, recesses 27, which are cylinders with a diameter HA and a depth CD, are provided in both surfaces of the current collector 21, at the same positions as in the fifth embodiment.

FIG. 9a and FIG. 9b illustrate a shape and positions of the recesses 27. FIG. 9a is a cross-sectional view of the lead portion 20 and the current collector 21 taken along line B-B', and FIG. 9b is a cross-sectional view thereof taken along line A-A'. Note that an enlarged cross-sectional view of the recesses 27 is the same as FIG. 7c.

Now, the degree of volume reduction in each of the regions is discussed. In contrast to the fifth embodiment in which the through-holes 26 are provided, the recesses 27 are provided in the sixth embodiment. The numbers and the diameters are the same, whereas the depths are different (the through-holes 26 have the depth HD, whereas the recesses 27 have the depth CD). Accordingly, as with the fifth embodiment, the reduction in volume is greater in the distal region than in the proximal region.

Thus, when the volume reduction ratios of the proximal region and the distal region in the sixth embodiment are compared, the reduction ratio of the distal region is greater than the reduction ratio of the proximal region.

Effects

Effects similar to those of the second embodiment can be produced.

Seventh Embodiment

In the seventh embodiment, a plurality of through-holes 28, which have a cylindrical shape, are provided in the current collector 21 such that a location closer to the joining boundary gh has a smaller diameter through-hole 28.

FIG. 10a and FIG. 10b illustrate a shape of the current collector 21. FIG. 10a is a cross-sectional view of the lead portion 20 and the current collector 21 taken along line and FIG. 10b is a cross-sectional view thereof taken along line A-A'.

Comparison of Volume Reduction Ratio Between Regions

Now, the degrees of volume reduction in the proximal region and the distal region are discussed. Since the through-holes 28 in the distal region have a larger diameter than the through-holes 28 in the proximal region, the reduction in volume is greater in the distal region than in the proximal region.

Thus, when the volume reduction ratios of the proximal region and the distal region in the seventh embodiment are compared, the reduction ratio of the distal region is greater than the reduction ratio of the proximal region.

Effects

Effects similar to those of the first embodiment can be produced.

Eighth Embodiment

In the eighth embodiment, a plurality of recesses 29, which have a cylindrical shape, are provided in both surfaces of the current collector 21, at the same positions as in the seventh embodiment, such that a location closer to the joining boundary gh has a smaller diameter recess 29. The recesses 29 have the same depth.

FIG. 11a and FIG. 11b illustrate a shape and positions of the recesses 29. FIG. 11a is a cross-sectional view of the lead portion 20 and the current collector 21 taken along line and FIG. 11b is a cross-sectional view thereof taken along line A-A'.

Now, the degree of volume reduction in each of the regions is discussed. In contrast to the seventh embodiment in which the through-holes 28 are provided, the recesses 29 are provided in the eighth embodiment; however, the numbers and the diameters are the same. Accordingly, as with the seventh embodiment, the reduction in volume is greater in the distal region than in the proximal region.

Thus, in the eighth embodiment, too, when the volume reduction ratios of the proximal region and the distal region are compared, the reduction ratio of the distal region is greater than the reduction ratio of the proximal region.

Effects

Effects similar to those of the second embodiment can be produced.

Ninth Embodiment

In the ninth embodiment, a plurality of recesses 30, which have a cylindrical shape, are provided in the current collector 21 such that a location closer to the joining boundary gh has a shallower recess 30. The recesses 30 are assumed to have the same diameter.

FIG. 12a and FIG. 12b illustrate a shape of the current collector 21. FIG. 12a is a cross-sectional view of the lead portion 20 and the current collector 21 taken along line B-B', and FIG. 12b is a cross-sectional view thereof taken alone line A-A'.

Comparison of Volume Reduction Ratio Between Regions

Now, the degrees of volume reduction in the proximal region and the distal region are discussed. Assuming that the recesses 30 have the same diameter, since the recesses 30 in the distal region have a larger depth than the recesses 30 in the proximal region, the reduction in volume is greater in the distal region than in the proximal region.

Thus, in a location closer to the joining boundary gh, when the volume reduction ratios of the proximal region and the distal region in the ninth embodiment are compared, the reduction ratio of the distal region is greater than the reduction ratio of the proximal region.

Effects

Effects similar to those of the first embodiment can be produced.

Tenth Embodiment

In the tenth embodiment, a plurality of recesses 31 areprovided in the proximal region, and a plurality of through-holes 32 are provided in the distal region. That is, a plurality of recesses 31 are provided near the joining boundary gh, and a plurality of through-holes 32 are provided away from the joining boundary gh. The recesses 31 and the through-holes 32 are assumed to have the same diameter.

FIG. 13a and FIG. 13b illustrate a shape of the current collector 21. FIG. 13a is a cross-sectional view of the lead portion 20 and the current collector 21 taken along line B-B', and FIG. 13b is a cross-sectional view thereof taken along line A-A'.

Comparison of Volume Reduction Ratio Between Regions

Now, the degrees of volume reduction in the proximal region and the distal region are discussed. Assuming that the recesses 31 and the through-holes 32 have the same diameter, since the through-holes 32 are provided in the distal region, and the recesses 31 are provided in the proximal region, the reduction in volume is greater in the distal region than in the proximal region.

Thus, when the volume reduction ratios of the proximal region and the distal region in the tenth embodiment are compared, the reduction ratio of the distal region is greater than the reduction ratio of the proximal region.

Effects

Effects similar to those of the first embodiment can be produced.

Eleventh Embodiment

In the eleventh embodiment, through-holes 33, which have a cylindrical shape, are provided in the current collector 21 such that a location closer to the joining boundary gh has a smaller number of the through-holes 33.

FIG. 14a and FIG. 14b illustrate a shape of the current collector 21. FIG. 14a is a cross-sectional view of the lead portion 20 and the current collector' 21 taken along line B-B', and FIG. 14b is a cross-sectional view thereof taken along line A-A'.

Comparison of Volume Reduction Ratio Between Regions

Now, the degrees of volume reduction in the proximal region and the distal region are discussed. Assuming that the through-holes 33 have the same diameter, since the number of through-holes 33 in the distal region is greater than the number of through-holes 33 in the proximal region, the reduction in volume is greater in the distal region than in the proximal region.

Thus, when the volume reduction ratios of the proximal region and the distal region in the eleventh embodiment are compared, the reduction ratio of the distal region is greater than the reduction ratio of the proximal region.

Effects

Effects similar to those of the first embodiment can be produced.

Twelfth Embodiment

In the twelfth embodiment, recesses 34, which have a cylindrical shape, are provided in the current collector 21 such that a location closer to the joining boundary gh has a smaller number of the recesses 34. The recesses 34 have the same depth.

FIG. 15a and FIG. 15b illustrate a shape of the current collector 21. FIG. 15a is a cross-sectional view of the lead portion 20 and the current collector 21 taken along line B-B', and FIG. 15b is a cross-sectional view thereof taken along line A-A'.

Comparison of Volume Reduction Ratio Between Regions

Now, the degrees of volume reduction in the proximal region and the distal region are discussed. Assuming that the recess 34 have the same diameter, since the number of recesses 34 in the distal region is greater than the number of recesses 34 in the proximal region, the reduction in volume is greater in the distal region than in the proximal region.

Thus, when the volume reduction ratios of the proximal region and the distal region in the twelfth embodiment are compared, the reduction ratio of the distal region is greater than the reduction ratio of the proximal region.

Effects

Effects similar to those of the second embodiment can be produced.

Other Embodiments

In the embodiments described above, the joining boundary gh is located at the middle of the side cf of the current collector 21. That is, the lead portion 20 is disposed at a middle upper portion of the current collector 21. However, this is not intended to be limiting, and, as illustrated in FIG. 16, a lead portion 40 may be disposed at an upper end portion of the current collector 21.

Furthermore, in some of the embodiments described above, the through-holes or the recesses provided in the current collector 21 have a cylindrical shape. However, this is not intended to be limiting, and any of a variety of shapes, such as conical, truncated conical, elliptical conical, truncated elliptical conical, prismatic, pyramidal, and truncated pyramidal, may be employed as a shape of the through-holes or the recesses.

Figure 17:
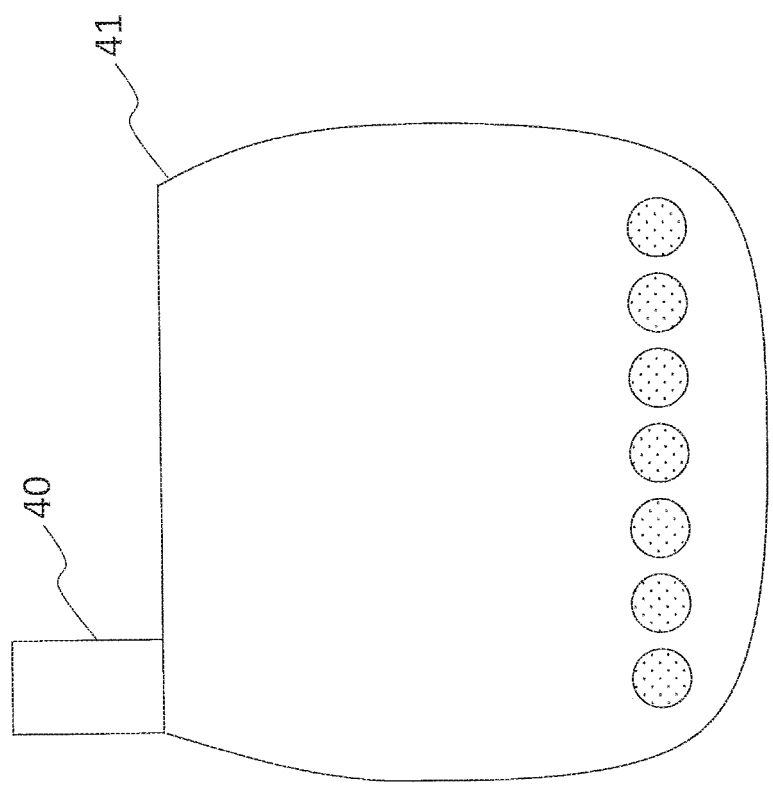
FIG. 17 is a diagram illustrating a different shape of a current collector.
Figure 18:
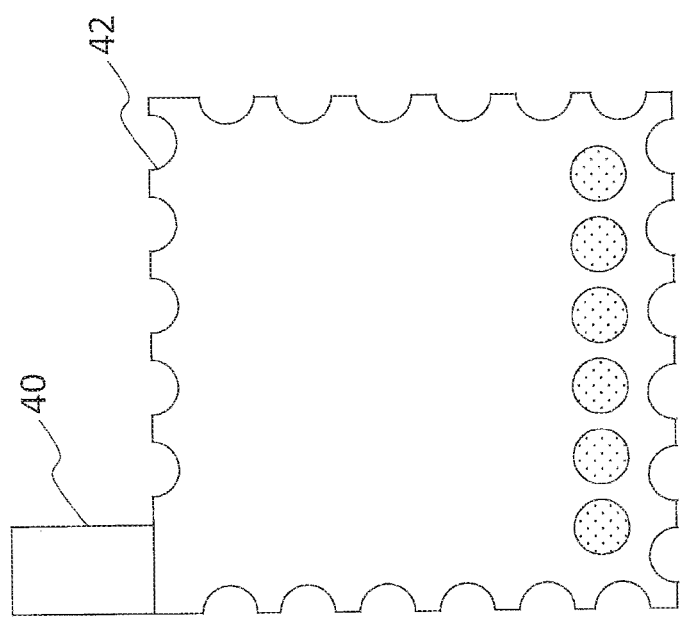
FIG. 18 is a diagram illustrating a different shape of a current collector.

Furthermore, in the embodiments described above, the current collector 21 defines a quadrilateral with the vertices c, d, e, and f as viewed in a direction perpendicular to surface of the current collector 21, and each of the sides is a straight line. However, this is not intended to be limiting, and, a shape in which each of the sides is formed of a curve, such as the shapes of current collectors 41 and 42 illustrated in FIG. 17 and FIG. 18, may be employed.

Figure 19:
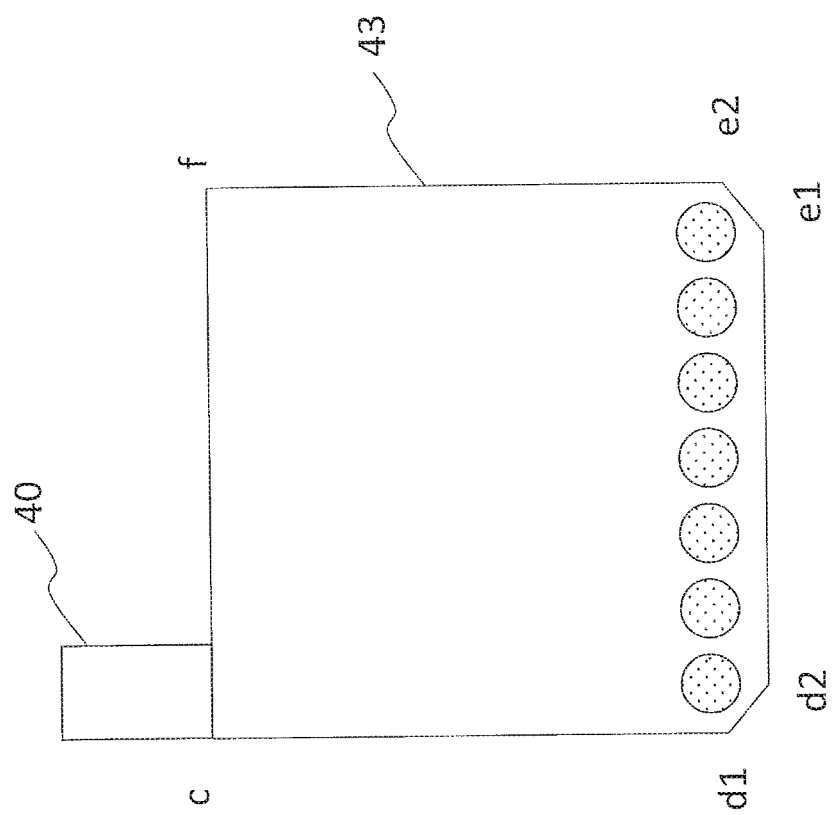
FIG. 19 is a diagram illustrating a different shape of a current collector.
Figure 20:
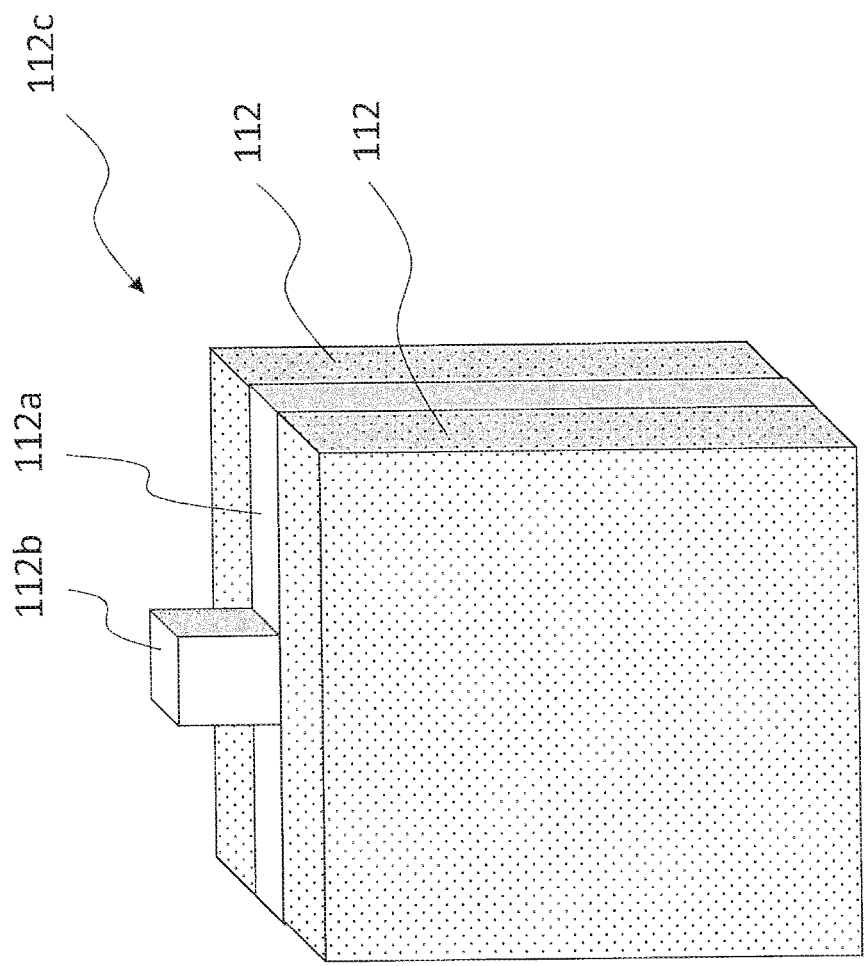
FIG. 20 is a diagram illustrating a metal negative electrode 112c, according to the related art.

In addition, in the embodiments described above, the current collector 21 defines a quadrilateral with the vertices c, d, e, and f. However, this is not intended to be limiting, and the current collector 21 may have a polygonal shape such that the current collector 21 is truncated at one or more of the vertices. Such a shape is illustrated in FIG. 19, in which a current collector 43 has a hexagonal shape having vertices c, d1, d2, e1, e2, and f.

Furthermore, the current collector 21 may have a shape that is not polygonal and may have a shape having a curved portion. In a case where the current collector 21 has a shape having a curved portion, a distance from the midpoint O to a point on the surface of the current collector 21, the point defining a maximum distance, is designated as a distance 12; and a distance from the midpoint to a point on the surface of the current collector, the point defining a distance less than the maximum distance 12, is designated as a region dividing distance $X_2$.

Numerical Limitations

In the embodiments described above, it is preferable that a relationship of the region dividing distance X with the maximum distance L be as follows.

$$\tfrac{1}{10}L \leq X \leq \tfrac{2}{3}L$$

It is more preferable that the relationship be as follows.

$$5\ mm \leq X \leq \tfrac{1}{2}L$$

If the region dividing distance X is less than $\tfrac{1}{10}L$, the effect of reducing resistance in the vicinity of the lead portion may be reduced. On the other hand, if the region dividing distance X is greater than $\tfrac{2}{3}L$, adhesion between the current collector and the active material may be degraded.

This application claims priority to Japanese Patent Application No. 2018-013995, filed in Japan on Jan. 30, 2018, the entire contents of which are incorporated by reference herein.

INDUSTRIAL APPLICABILITY

The present disclosure can be widely utilized in batteries, storage batteries, and the like that use an electrode formed of a current collector and a layered active material.

REFERENCE SIGNS LIST

1 Metal-air battery
12 Metal negative electrode
12a Metal negative electrode current collector
12b Negative electrode active material layer
20, 40 Lead portion
21, 41, 42, 43 Current collector
22, 24, 26, 28, 32, 33 Through-holes
23, 25, 27, 29, 30, 31, 34 Recesses
112 Active material
112a Current collector
112b Lead portion
112c Metal negative electrode
c, d, e, f, d1, d2, e1, e2 Vertices
g, h Boundary points
gh Joining boundary
O Midpoint of connection boundary
S Point on surface of current collector 21
L Maximum distance
X Region dividing distance
HD Depth of through-hole 22 (or thickness of current collector 21)
HH Short side of through-hole 22
HW Long side of through-hole 22
CD Depth of recess 23
HA Diameter of through-hole 24

The invention claimed is:

1. A metal negative electrode, comprising:
a current collector in a form of a planar plate that is quadrilateral;
a lead portion connected to the current collector with a joining boundary being disposed between the lead portion and the current collector; and
an active material layer including an active material, the active material layer being in contact with the current collector, wherein:
the current collector includes at least one through-hole provided to extend from a front surface of the planar plate toward a back surface of the planar plate,
the active material layer includes a first active material layer being in contact with a major surface of the current collector, and
a second active material layer being in contact with a back surface of the major surface of the current collector,
the first active material layer and the second active material layer are integrated via the at least one through-hole,
a distance from a midpoint of the joining boundary to a point on a surface of the current collector is designated as a region dividing distance, the point defining a distance less than a maximum distance between the midpoint and a farthest vertex, from the midpoint, among respective vertices as viewed in a direction perpendicular to the major surface, in the current collector, a first region is a region defined by distances from the midpoint, the distances being a distance equal to the region dividing distance and distances greater than the region dividing distance, and a second region is a region defined by distances from the midpoint that are less than the region dividing distance, a volume reduction ratio of the first region is greater than a volume reduction ratio of the second region, the volume reduction ratio of the first region being a ratio with respect to a volume of the first region determined assuming that the at least one through-hole is not present, the volume reduction ratio of the second region being a ratio with respect to a volume of the second region determined assuming that the at least one through-hole is not present, and the region dividing distance is 1/10 or greater and 2/3 or less of the maximum distance, and, of the first region and the second region, the at least one through-hole is provided only to the first region, and the at least one through-hole is not provided to the second region.

2. The metal negative electrode according to claim 1, wherein, in the current collector, the at least one through-hole has a rectangular shape and is provided along the side of the current collector, the side being opposite to the joining boundary.

3. The metal negative electrode according to claim 1, wherein:
the at least one through-hole comprises a plurality of through-holes, and
in the current collector, the plurality of through-holes is generally circular and is provided along the side of the current collector, the side being opposite to the joining boundary.

4. The metal negative electrode according to claim 1, wherein:
the at least one through-hole comprises a plurality of through-holes, and
in the current collector, the plurality of through-holes is generally circular and is provided along at least a portion of sides of the current collector.

5. The metal negative electrode according to claim 1, wherein:
the at least one through-hole comprises a plurality of through-holes, and
in the current collector, the plurality of through-holes is generally circular and is provided such that through-holes at a location closer to the joining boundary have smaller diameters than through-holes at a location further away from the joining boundary.

6. The metal negative electrode according to claim 1, wherein:
the at least one through-hole comprises a plurality of through-holes, and
in the current collector, the plurality of through-holes is generally circular and is provided such that a number of through-holes at a location closer to the joining boundary is smaller than a number of through-holes at a location further away from the joining boundary.

7. The metal negative electrode according to claim 1, wherein, in the current collector, the lead portion is located at a middle upper portion of the current collector.

8. The metal negative electrode according to claim 1, wherein, in the current collector, the lead portion is located at an upper end portion of the current collector.

9. The metal negative electrode according to claim 1, wherein, in the current collector, at least one of sides of the current collector is a curve.

10. The metal negative electrode according to claim 1, wherein the current collector defines a polygon such that the current collector is truncated in at least one of vertices of the current collector.

11. The metal negative electrode according to claim 1, wherein the active material adheres to the current collector.

12. A metal-air battery comprising the metal negative electrode according to claim 1.

* * * * *